US008829439B2

(12) United States Patent
Damarla

(10) Patent No.: US 8,829,439 B2
(45) Date of Patent: Sep. 9, 2014

(54) TARGET DETECTOR WITH SIZE DETECTION AND METHOD THEREOF

(71) Applicant: U.S. Army Research Laboratory, Adelphi, MD (US)

(72) Inventor: Thyagaraju Damarla, Laurel, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 13/652,570

(22) Filed: Oct. 16, 2012

(65) Prior Publication Data

US 2014/0103212 A1 Apr. 17, 2014

(51) Int. Cl.
*G01J 5/00* (2006.01)
*G01J 5/02* (2006.01)

(52) U.S. Cl.
USPC ........................................ 250/338.3; 250/345

(58) Field of Classification Search
USPC ................................................ 250/338.3, 345
See application file for complete search history.

(56) References Cited

U.S. PATENT DOCUMENTS

| | | | | |
|---|---|---|---|---|
| 6,532,901 | B2 * | 3/2003 | Isley et al. | 119/712 |
| 8,115,641 | B1 * | 2/2012 | Dempsey | 340/573.1 |
| 2007/0152156 | A1 * | 7/2007 | Zhevelev et al. | 250/339.14 |
| 2007/0241863 | A1 * | 10/2007 | Udagawa et al. | 340/5.83 |

OTHER PUBLICATIONS

J. Cooper, "A fast-response pyroelectric thermal detector", Journal of Scientific Instrumentation, vol. 39, pp. 467-472 (1962).

Pyroelectricity, Group of Dielectric Physics, Wroclaw Univeristy of Technology, http://www.gdp.if.pwr.wroc.pl/pliki/pyroelectric-effect.pdf, created Nov. 10, 2010.

* cited by examiner

*Primary Examiner* — David Porta
*Assistant Examiner* — Kenneth J Malkowski
(74) *Attorney, Agent, or Firm* — Lawrence E. Anderson

(57) ABSTRACT

A method and system for detecting targets comprising at least one first receiver for receiving radiation, the radiation comprises beams of radiation spaced horizontally; at least one second receiver for receiving radiation, the radiation comprises beams of radiation spaced horizontally and vertically such that the beams of radiation received by the second receiver travel through different predetermined heights from the horizontal plane; at least one processor for receiving data from the first and second receivers, the at least one receiver operating to locate a target passing in the vicinity of the first and second receivers and determine the height of the target based upon the recordation of certain of the beams at a predetermined heights relative to the horizontal plane and the width of a target based upon the horizontal spacing of the beams.

16 Claims, 24 Drawing Sheets

Beam patterns of both sensors from top and front view

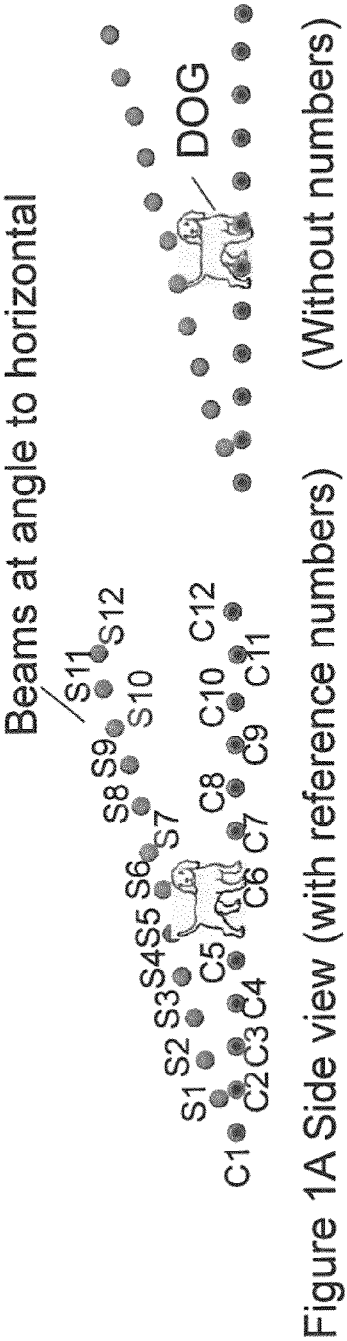
Figure 1A Side view (with reference numbers) (Without numbers)
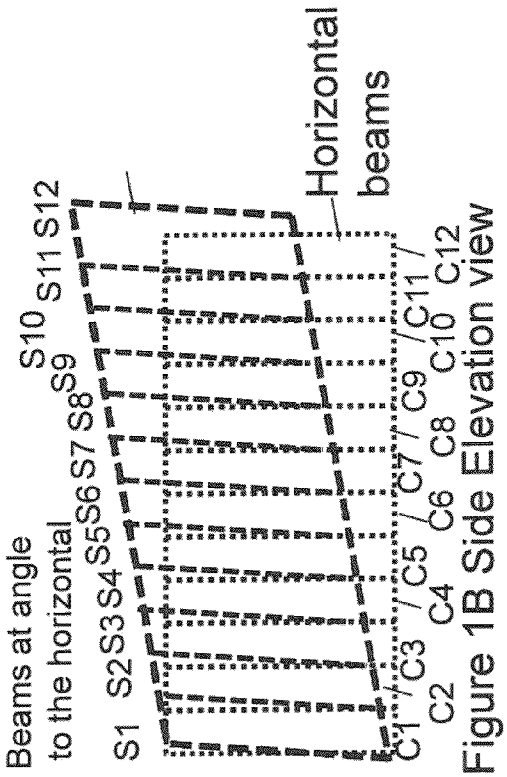
Figure 1B Side Elevation view
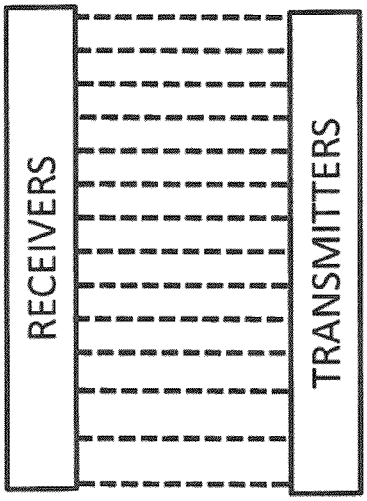
Figure 1C

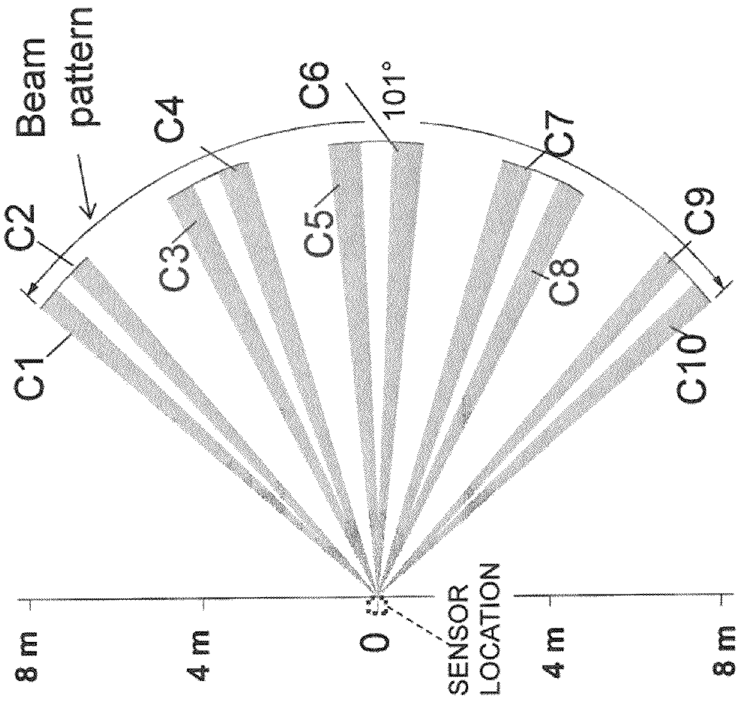
Figure 2A Fresnel lens array- TOP VIEW

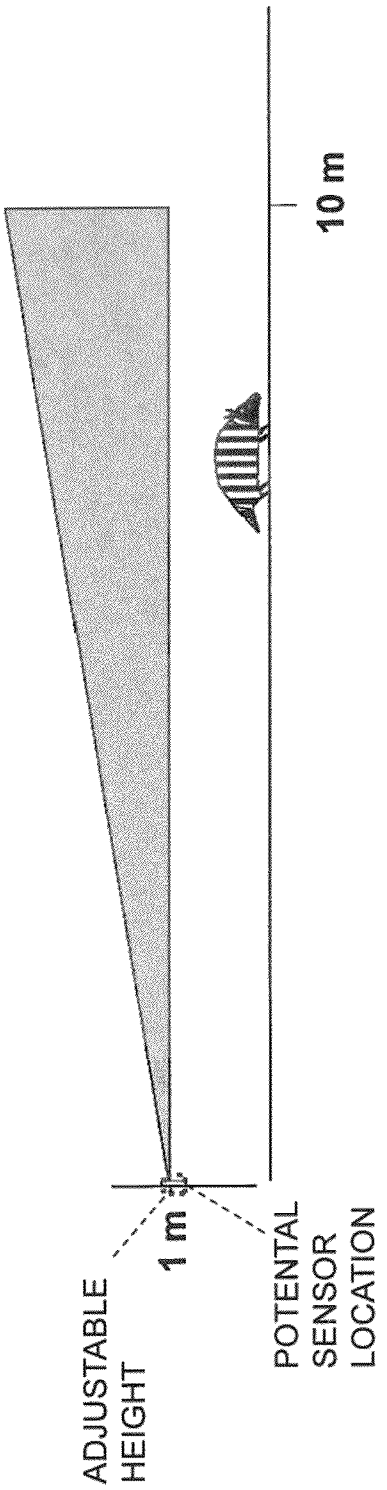
Figure 2B Fresnel lens array - SIDE VIEW

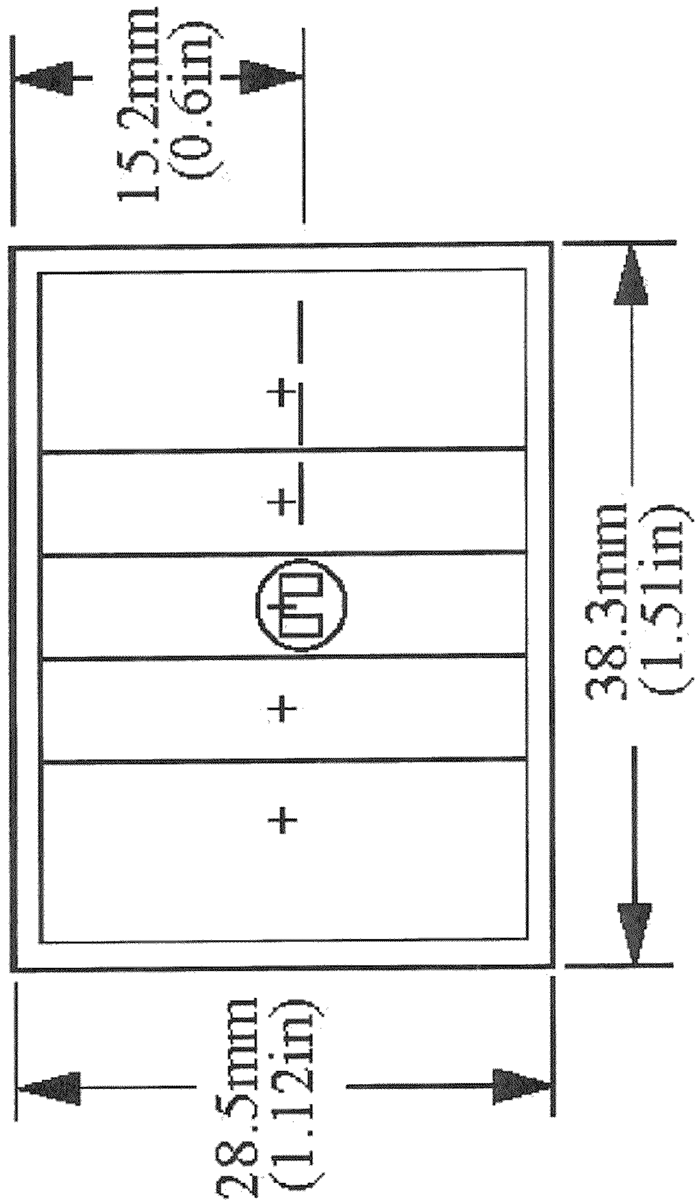
Figure 2C Fresnel lens array FRONT VIEW

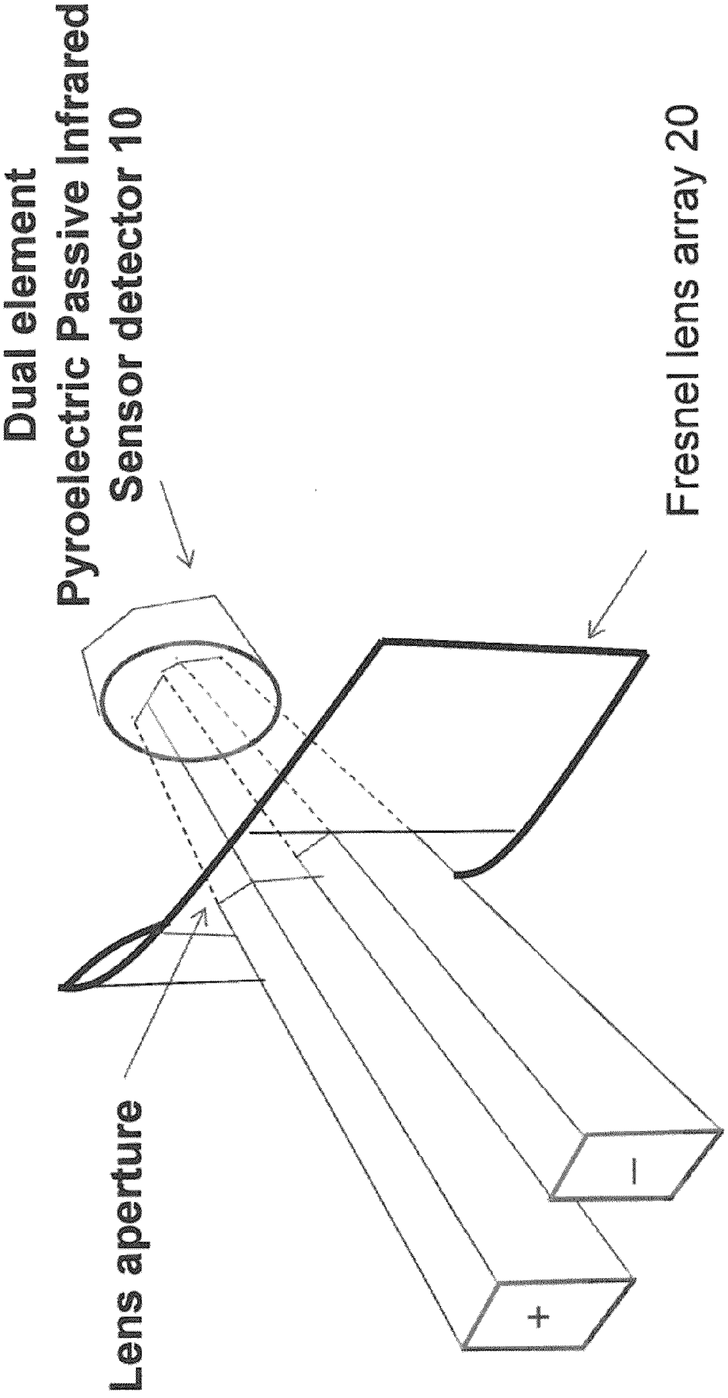
FIG. 3 Pyroelectric Passive Infrared Detector with Fresnel Lens Array

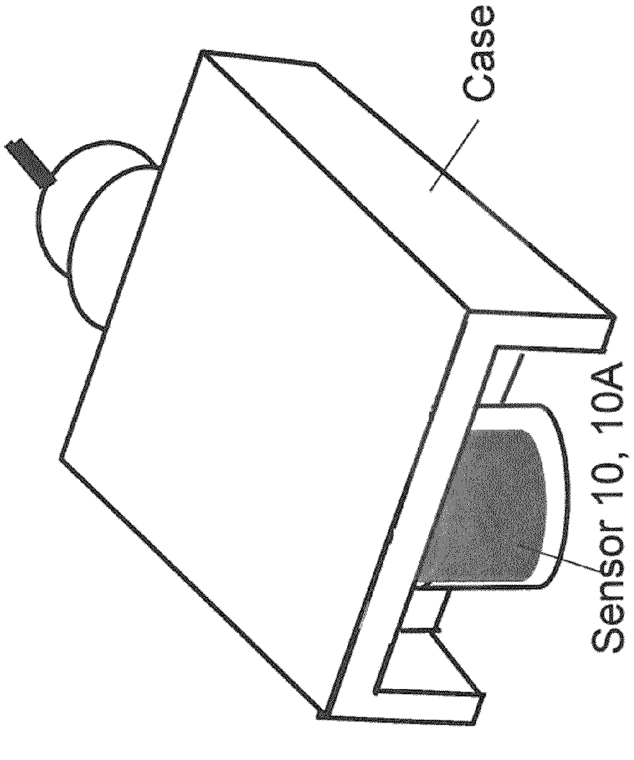
FIG. 4 PIR Sensor in a protective case

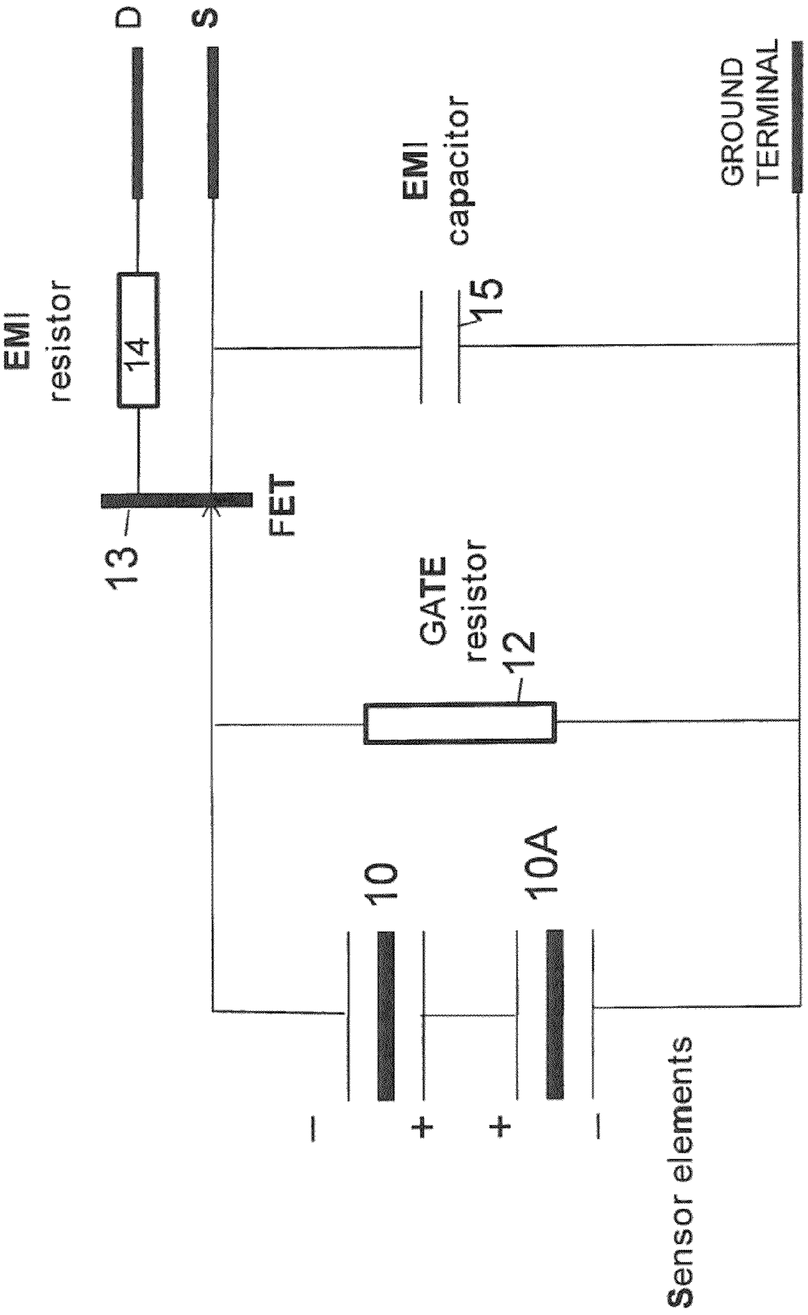
FIG. 5 Circuit diagram used to capture the output of the sensor

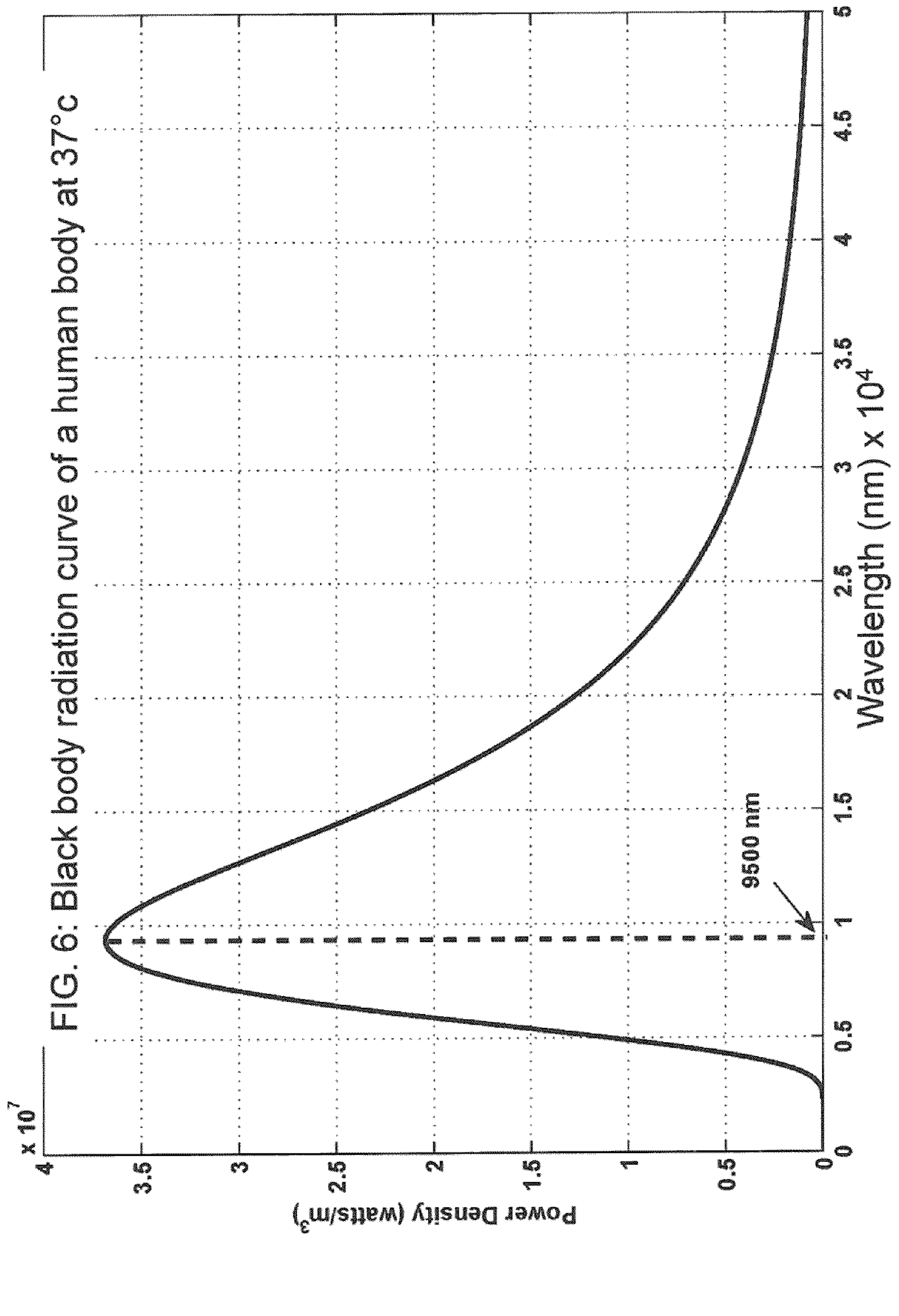
FIG. 6: Black body radiation curve of a human body at 37°c

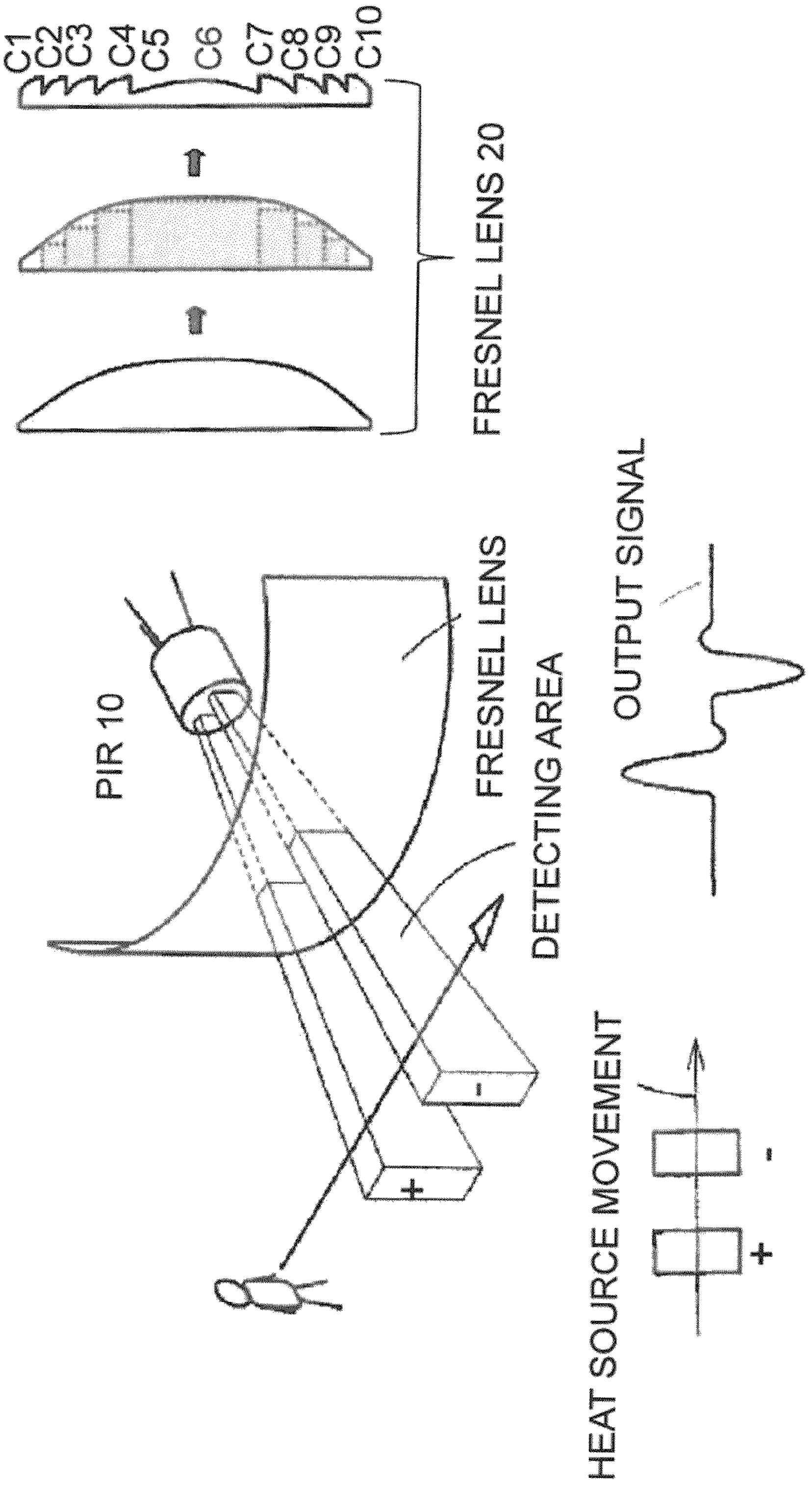
FIG. 7 Output signal generated when a heat source walks across the beams

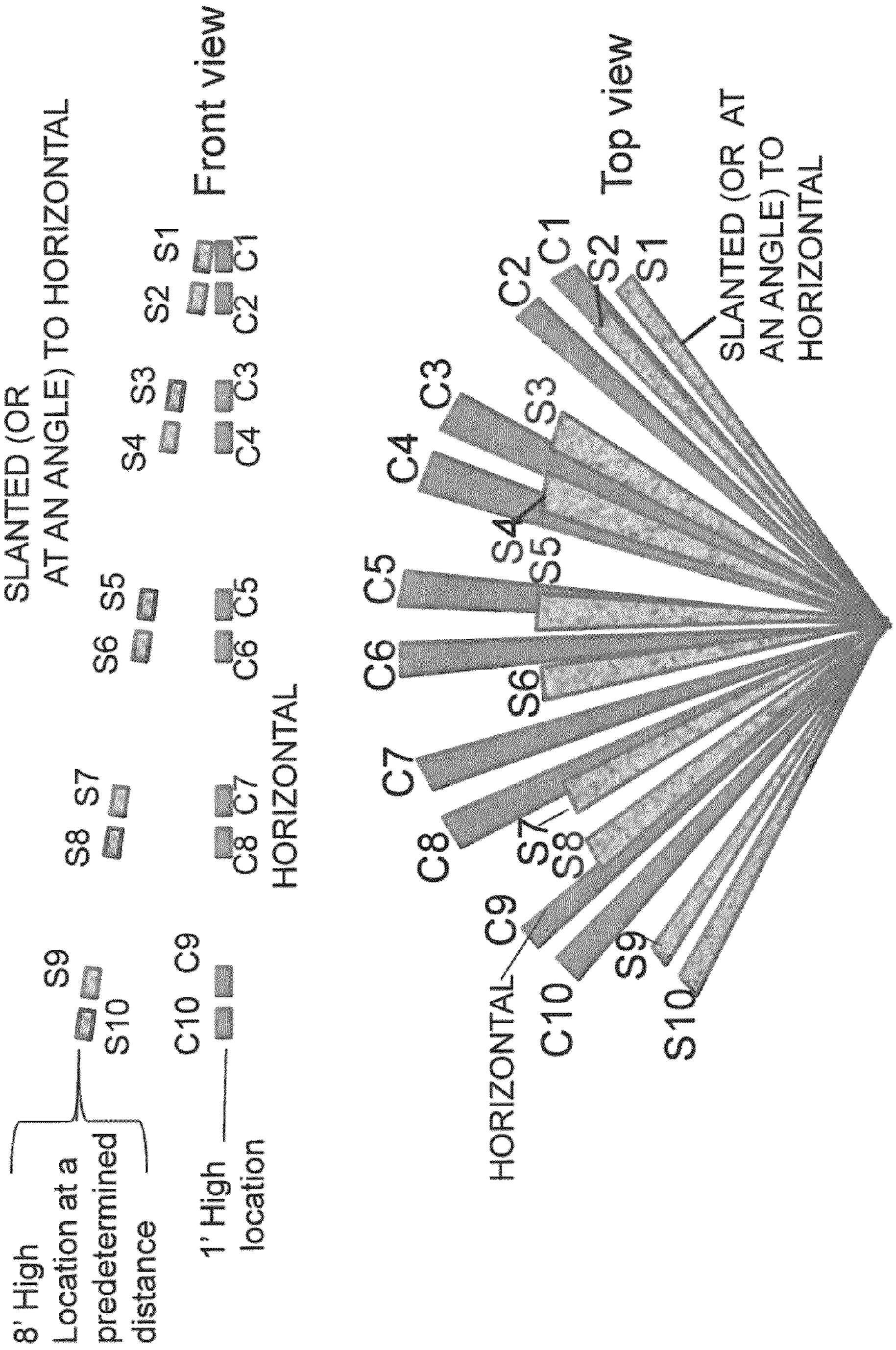
Figure 9. Beam patterns of both sensors from top and front view

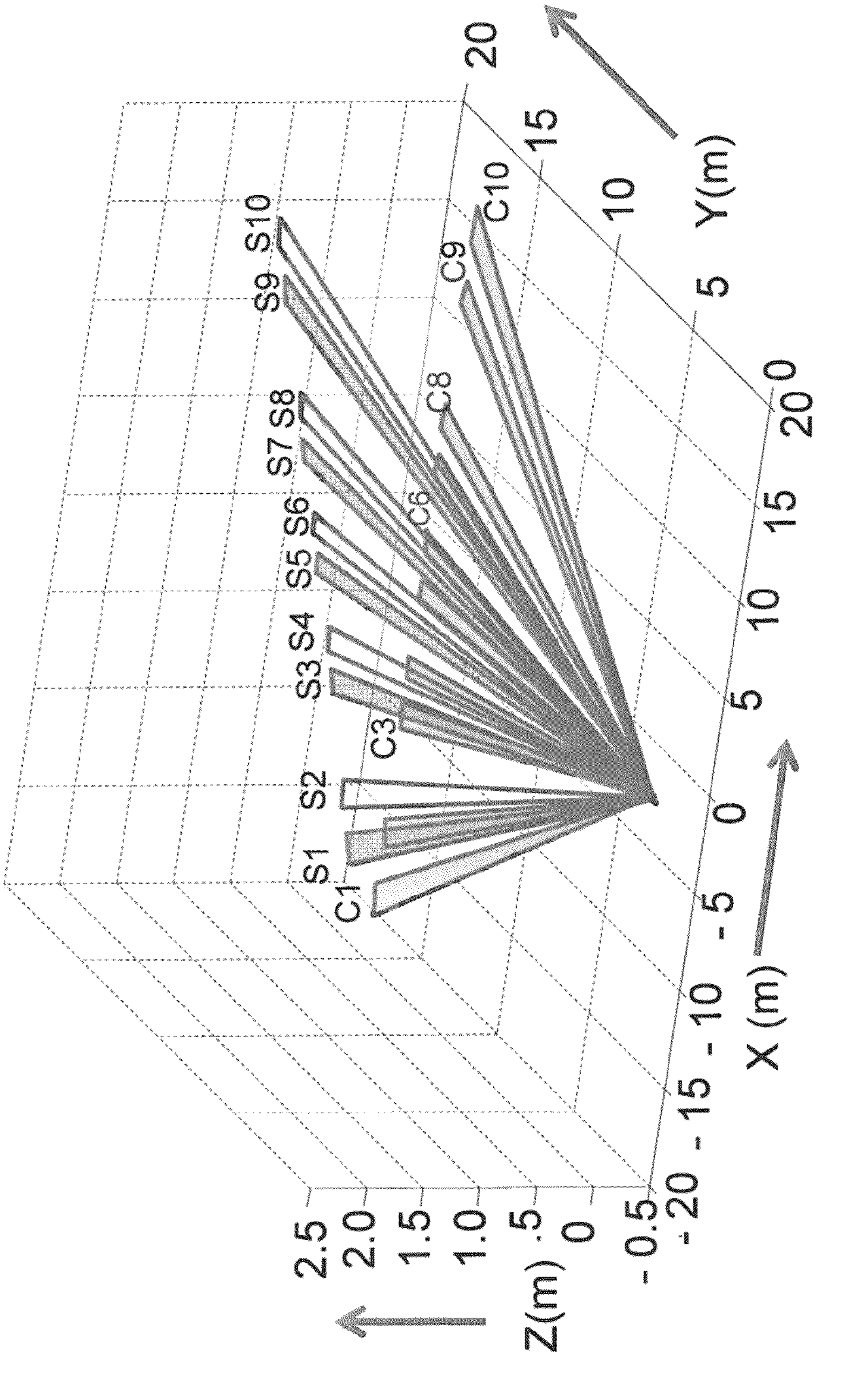
FIG. 10 Three-Dimensional Diagram
Slightly misaligned beam patterns of both sensors

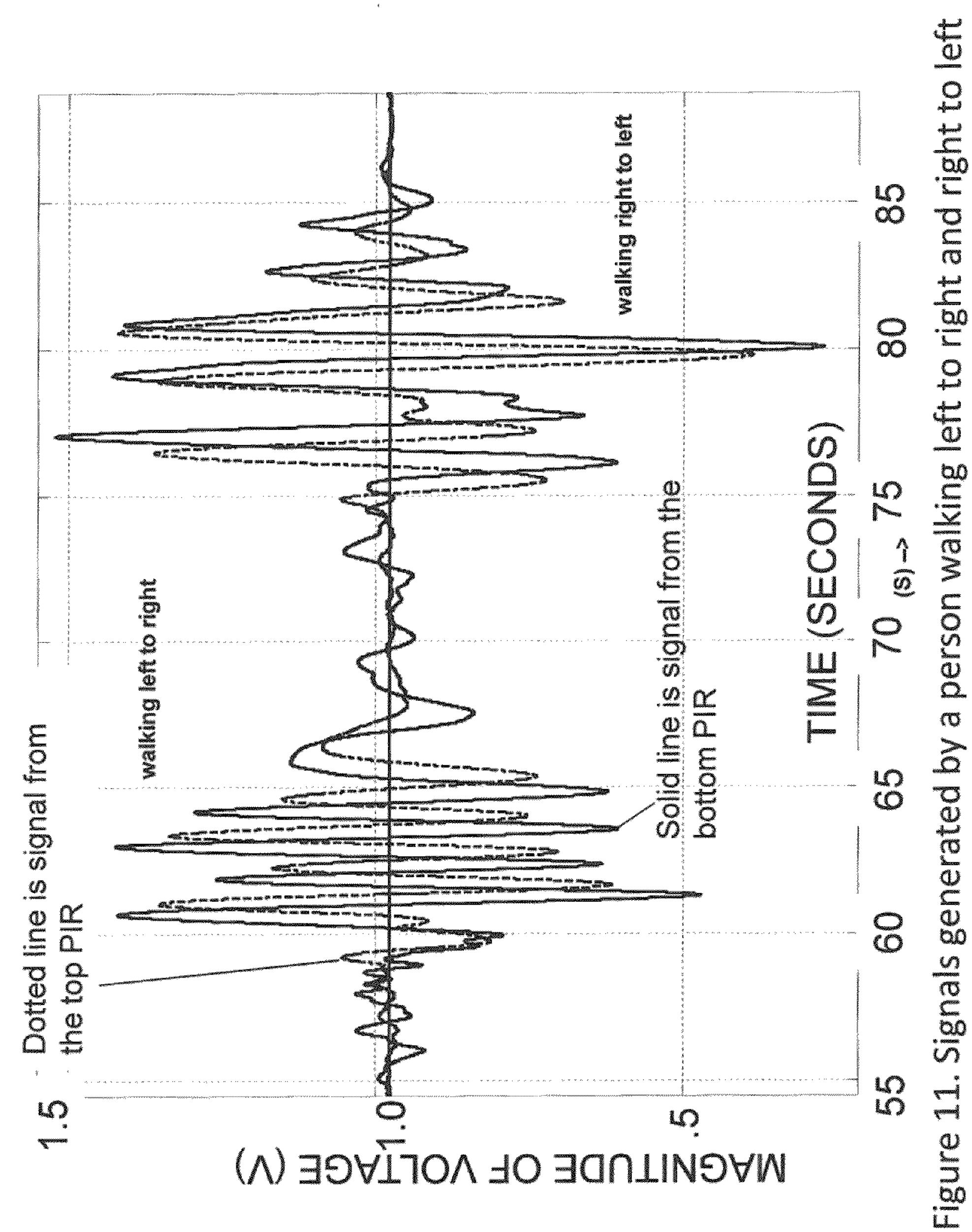
Figure 11. Signals generated by a person walking left to right and right to left

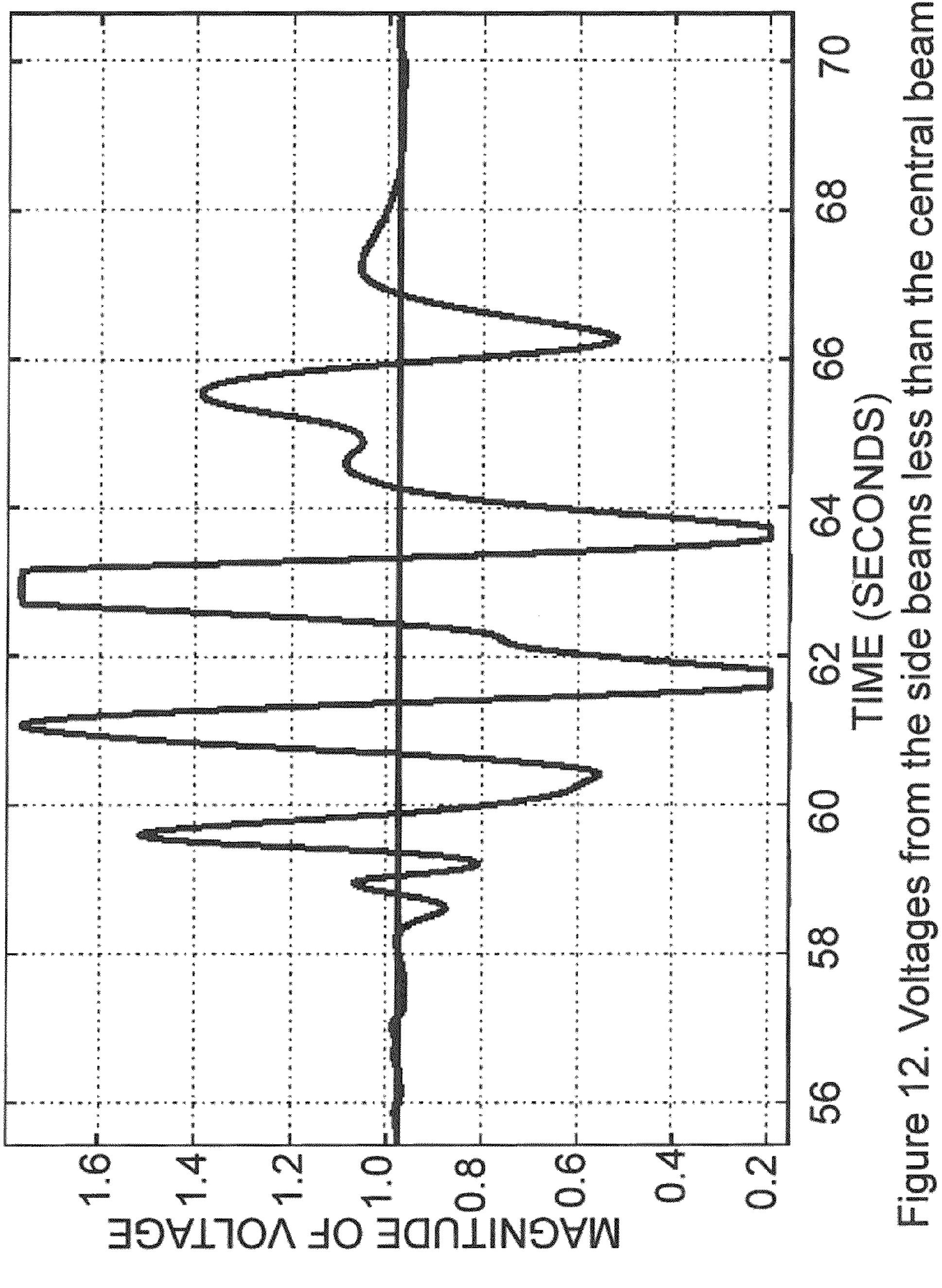
Figure 12. Voltages from the side beams less than the central beam

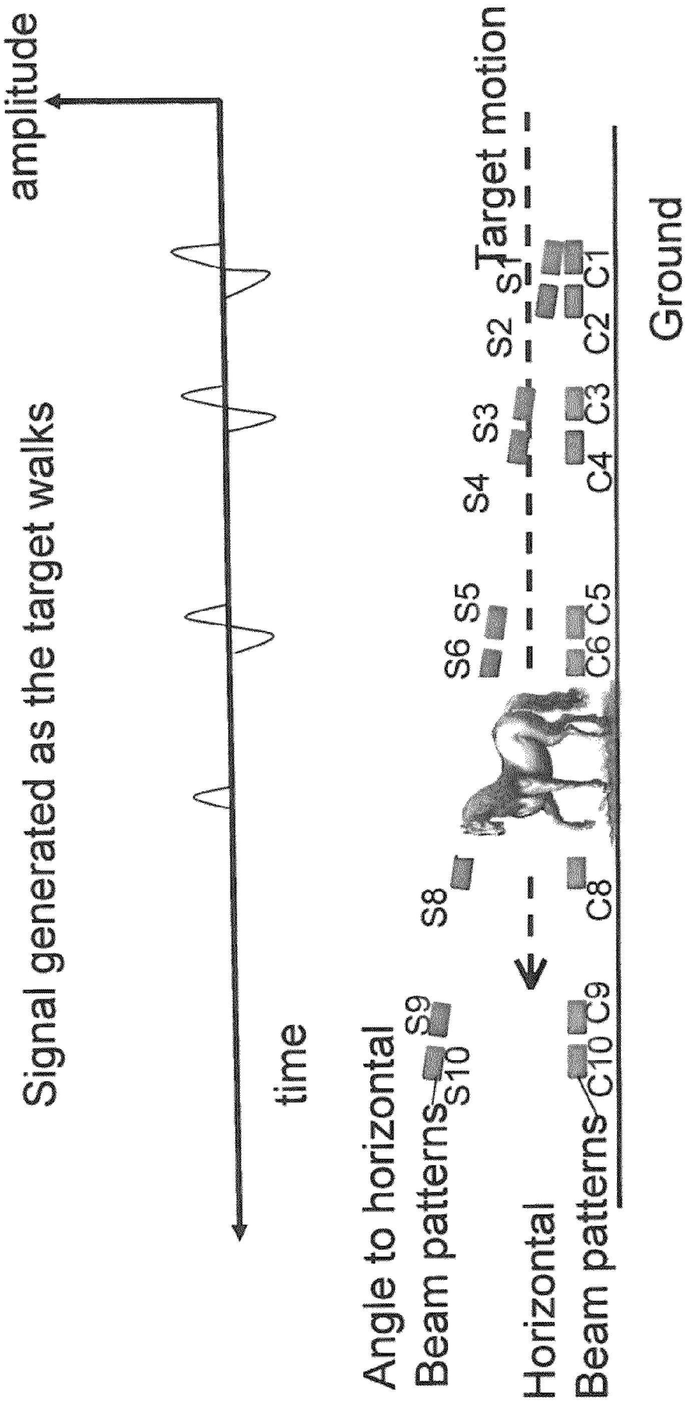
Figure 13. Target intersecting a beam pattern

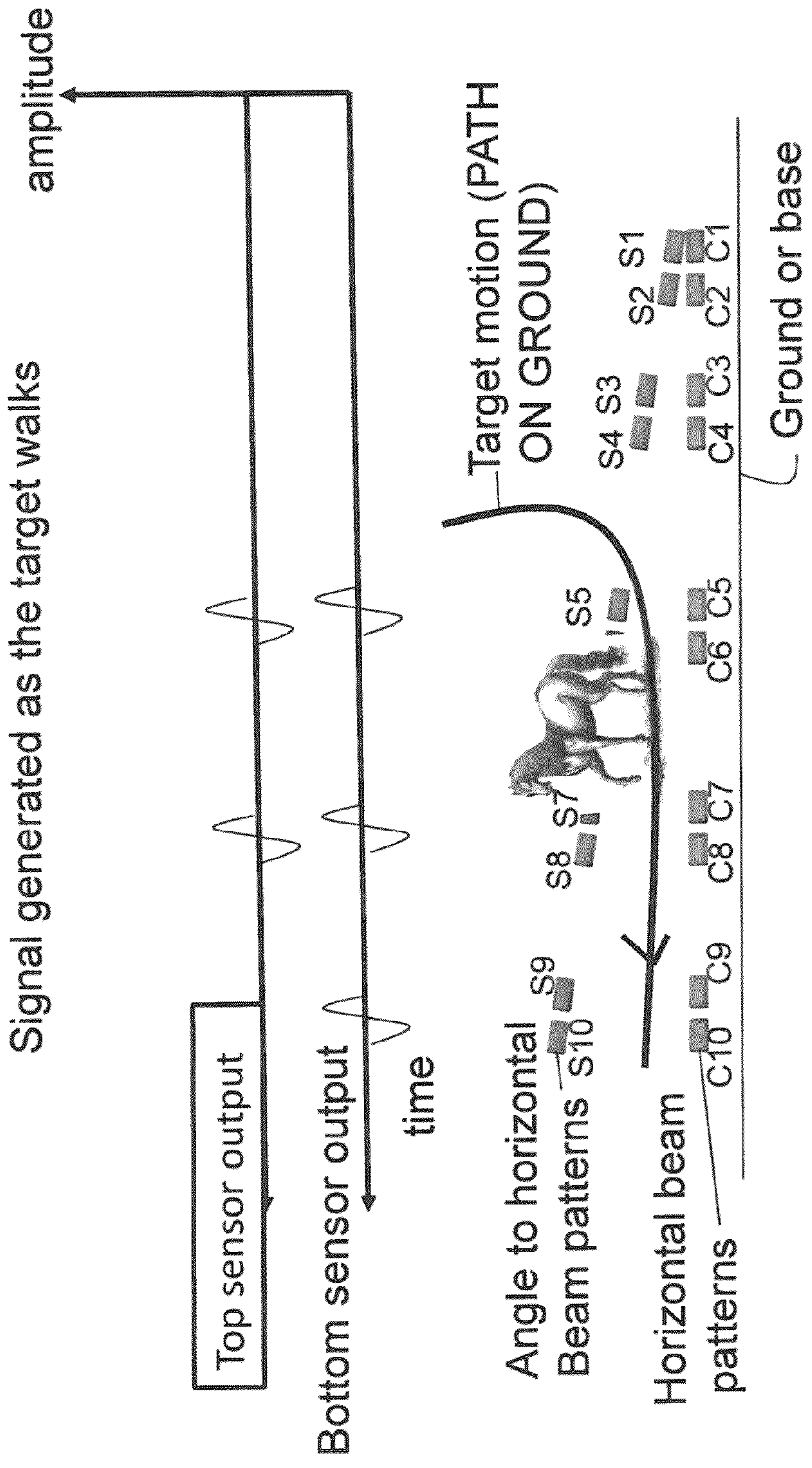
FIG. 14 Target intersecting only few beam patterns

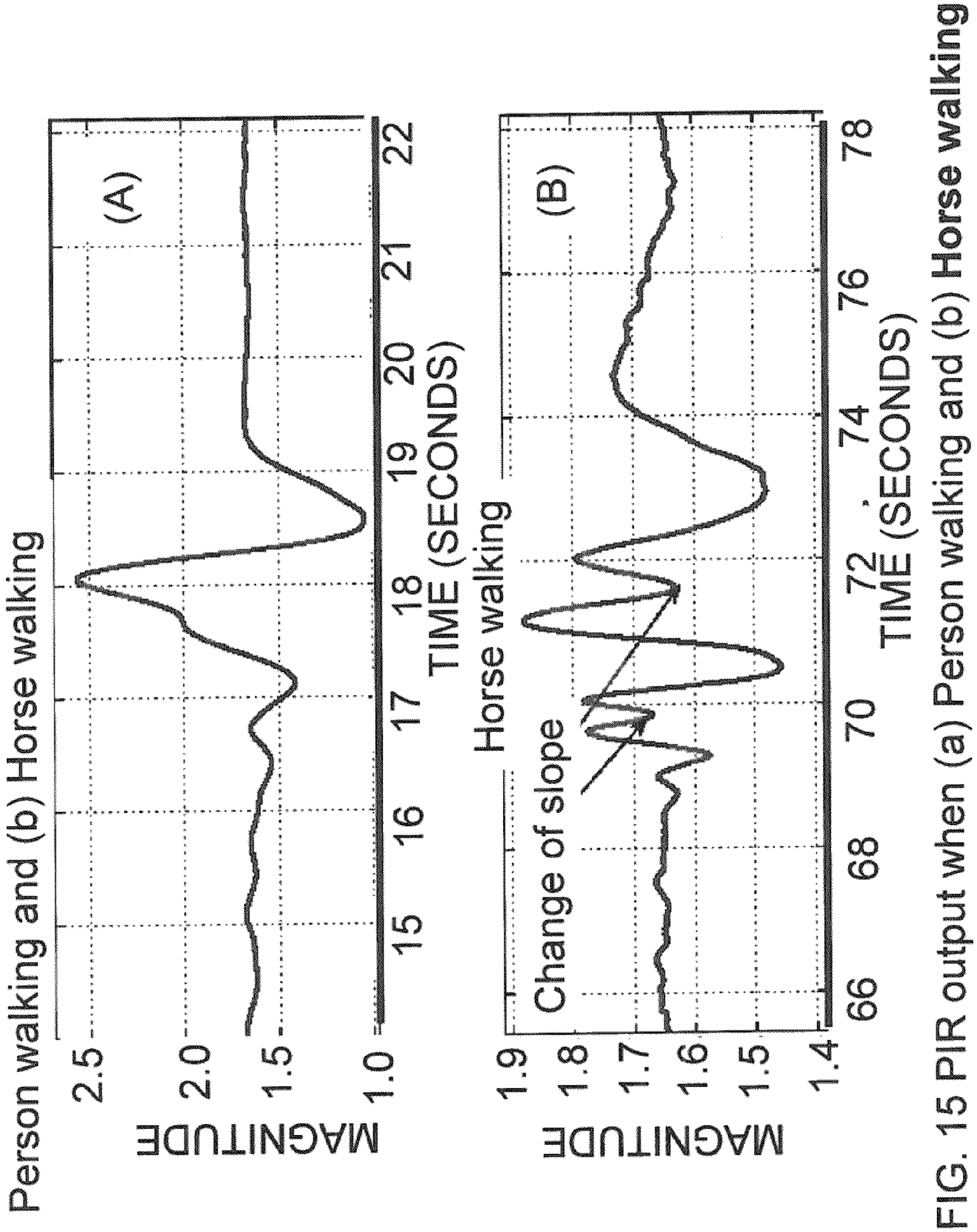
FIG. 15 PIR output when (a) Person walking and (b) Horse walking

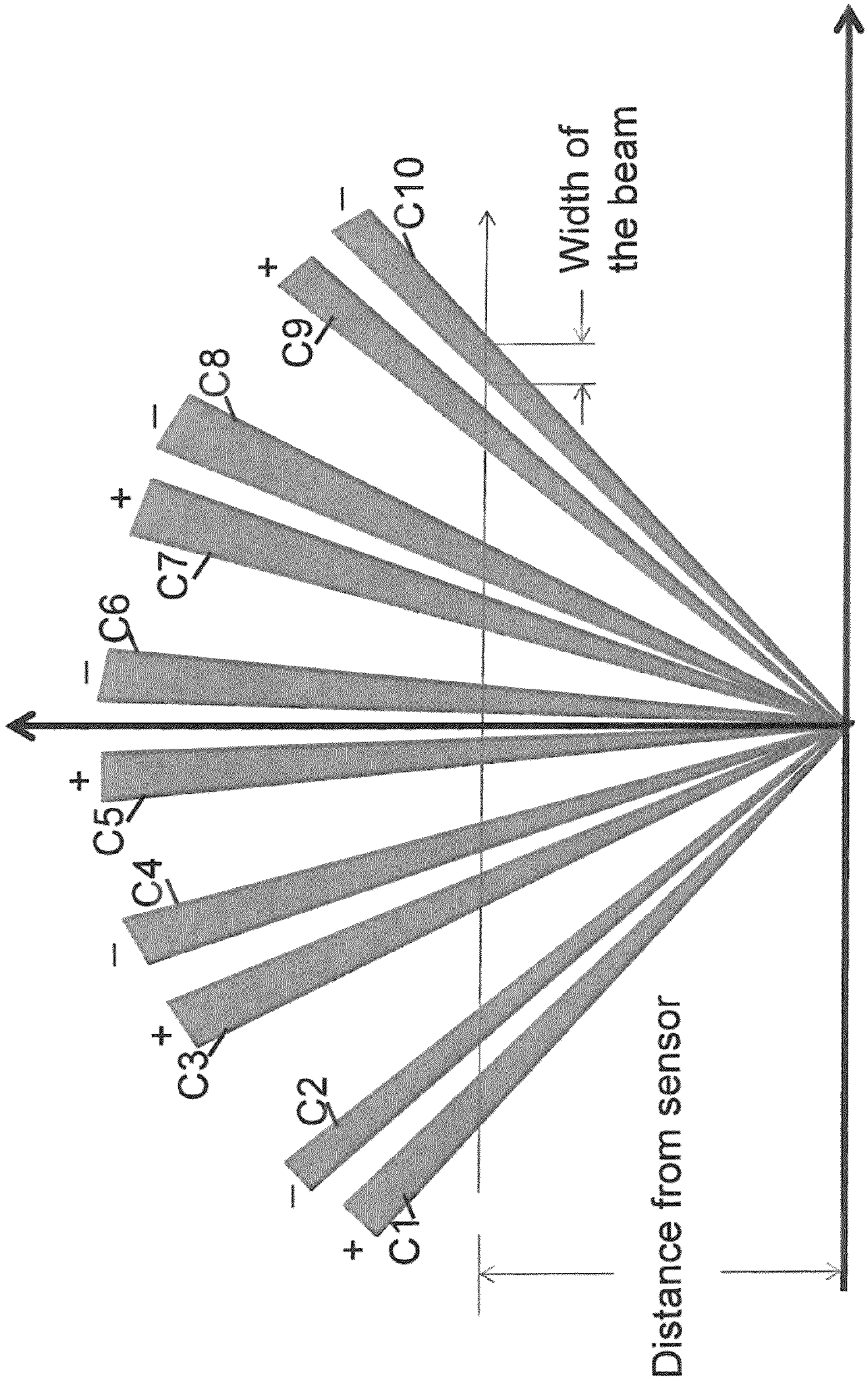
FIG. 16 Width of a beam at a distance

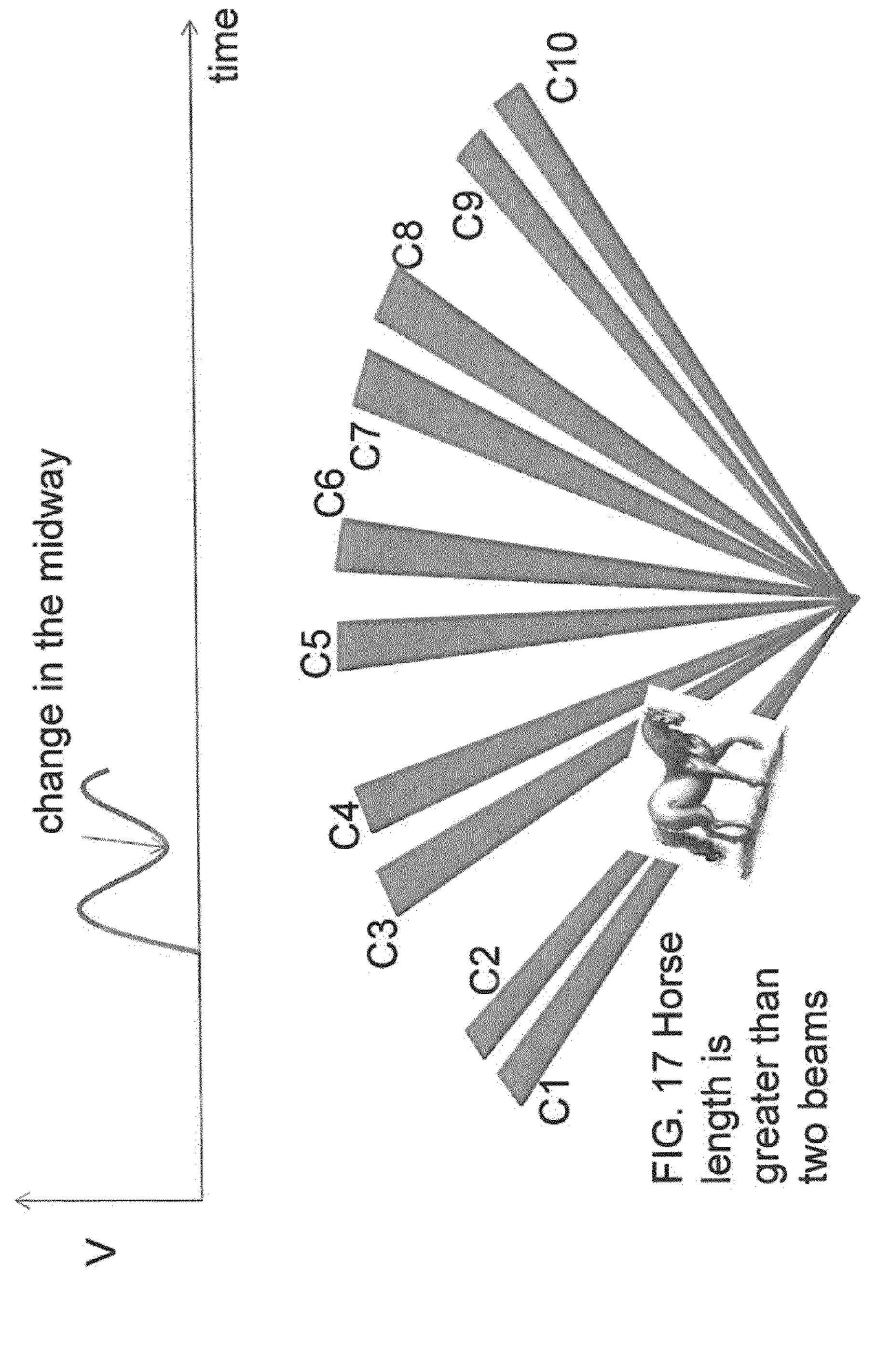
FIG. 17 Horse length is greater than two beams

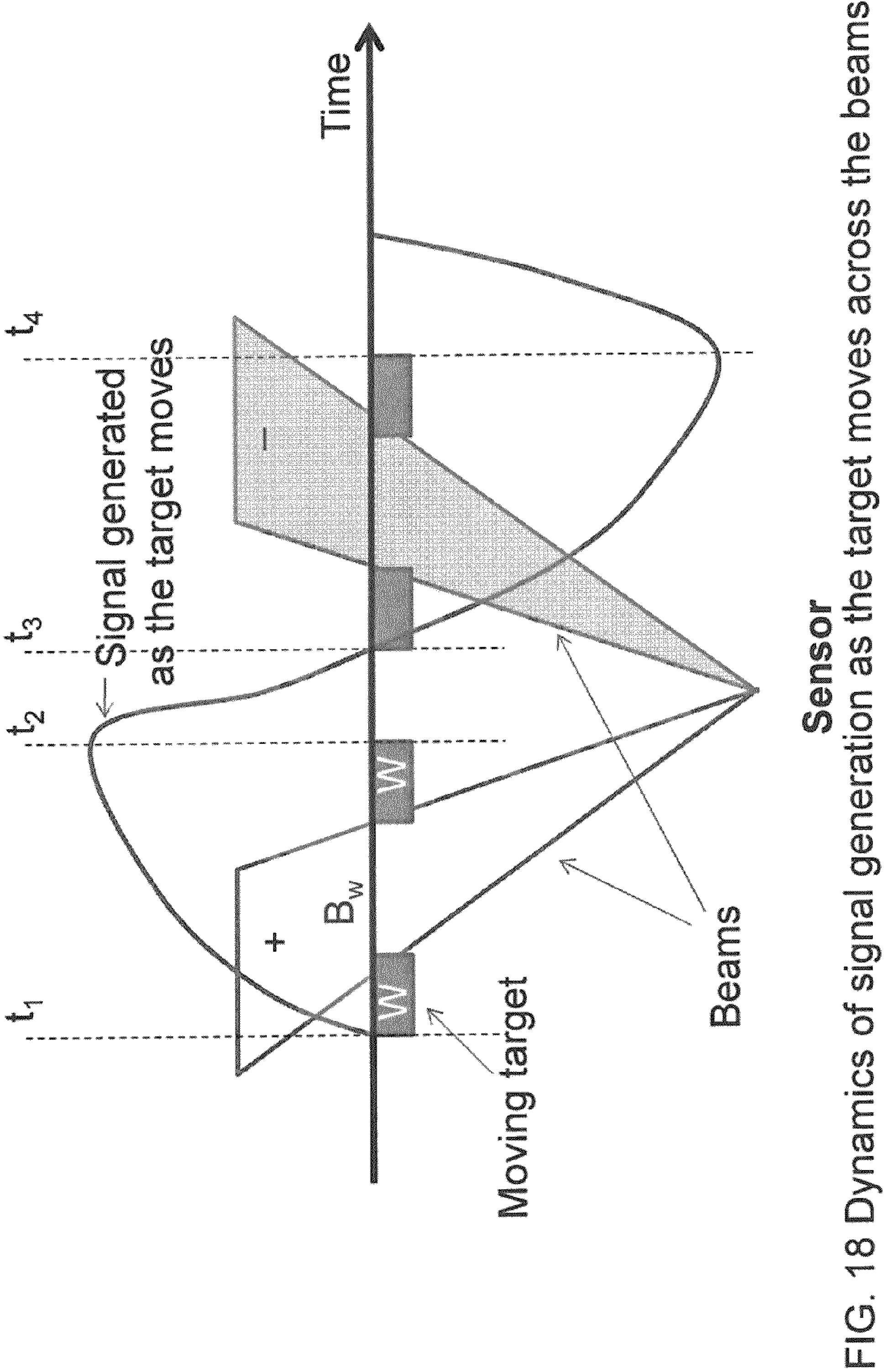
FIG. 18 Dynamics of signal generation as the target moves across the beams

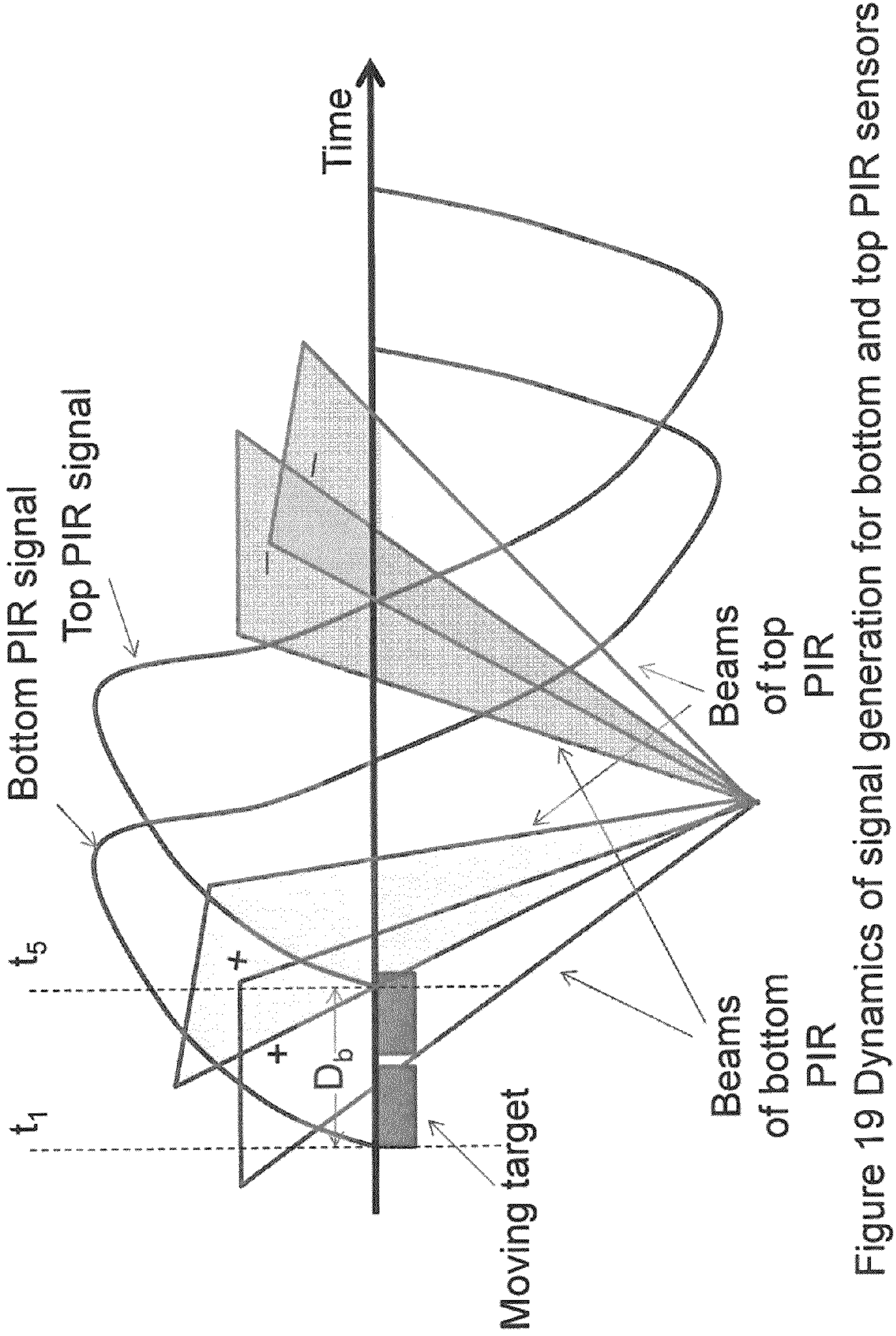
Figure 19 Dynamics of signal generation for bottom and top PIR sensors

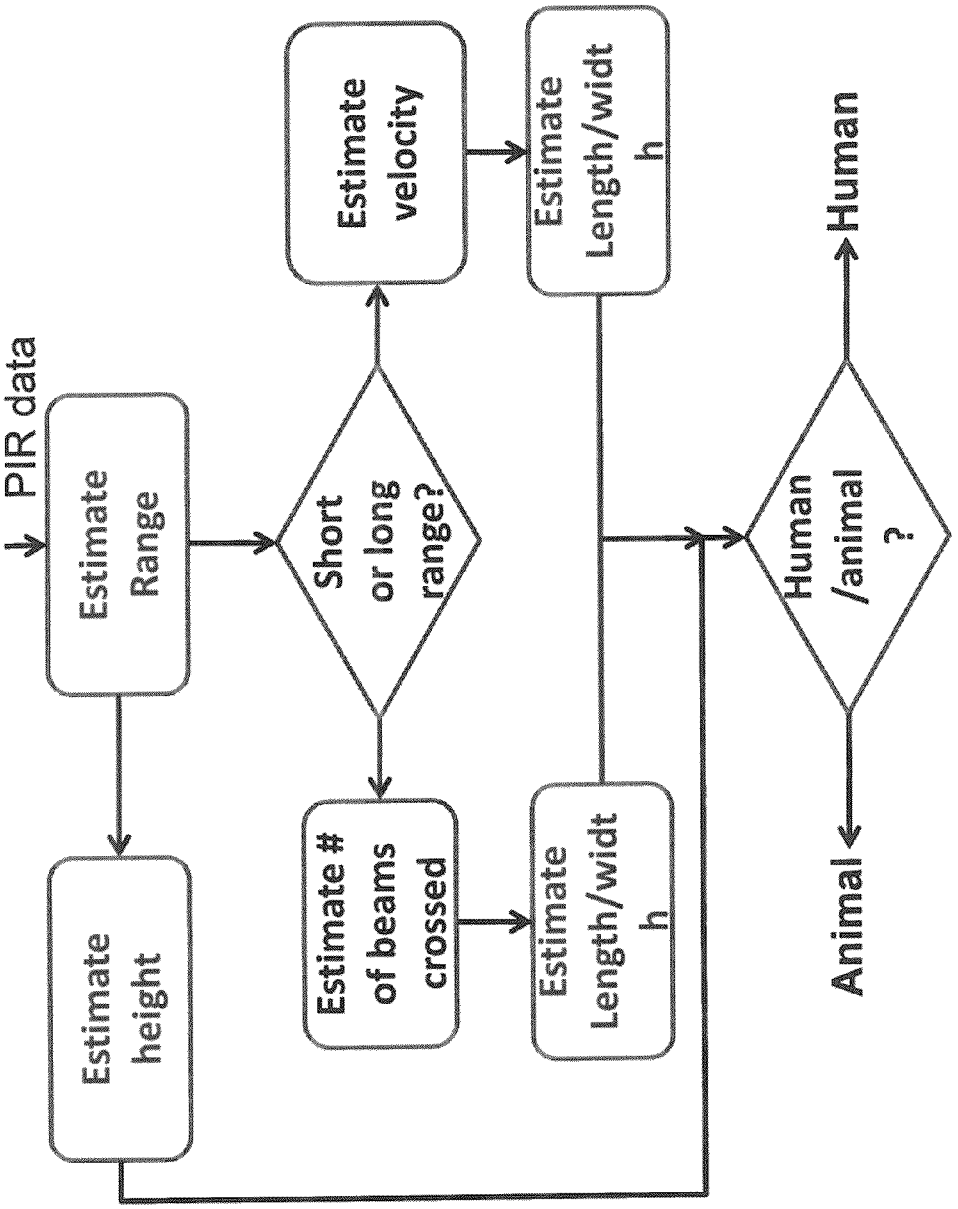
FIG. 20 Flowchart for the algorithm to determine human or animal

| Dist. from sensor (m) | beam 1 + (m) | beam 1 − (m) | beam 2 + (m) | beam 2 − (m) | beam 3 + (m) | beam 3 − (m) | beam 4 + (m) | beam 4 − (m) | beam 5 + (m) | beam 5 − (m) |
|---|---|---|---|---|---|---|---|---|---|---|
| 1 | 0.1194 | 0.0964 | 0.0766 | 0.0781 | 0.0702 | 0.0703 | 0.0781 | 0.0880 | 0.0980 | 0.1218 |
| 2 | 0.2388 | 0.1928 | 0.1533 | 0.1563 | 0.1404 | 0.1405 | 0.1563 | 0.1760 | 0.1959 | 0.2436 |
| 3 | 0.3582 | 0.2892 | 0.2299 | 0.2344 | 0.2106 | 0.2108 | 0.2344 | 0.2640 | 0.2939 | 0.3654 |
| 4 | 0.4775 | 0.3856 | 0.3066 | 0.3125 | 0.2807 | 0.2811 | 0.3125 | 0.3520 | 0.3919 | 0.4872 |
| 5 | 0.5969 | 0.4820 | 0.3832 | 0.3907 | 0.3509 | 0.3514 | 0.3907 | 0.4400 | 0.4899 | 0.6089 |
| 6 | 0.7163 | 0.5784 | 0.4599 | 0.4688 | 0.4211 | 0.4216 | 0.4688 | 0.5280 | 0.5878 | 0.7307 |
| 7 | 0.8357 | 0.6748 | 0.5365 | 0.5469 | 0.4913 | 0.4919 | 0.5469 | 0.6160 | 0.6858 | 0.8525 |
| 8 | 0.9551 | 0.7712 | 0.6132 | 0.6251 | 0.5615 | 0.5622 | 0.6251 | 0.7040 | 0.7838 | 0.9743 |
| 9 | 1.0745 | 0.8676 | 0.6898 | 0.7032 | 0.6317 | 0.6325 | 0.7032 | 0.7920 | 0.8817 | 1.0961 |
| 10 | 1.1938 | 0.9640 | 0.7665 | 0.7813 | 0.7018 | 0.7027 | 0.7813 | 0.8800 | 0.9797 | 1.2179 |
| 11 | 1.3132 | 1.0604 | 0.8431 | 0.8595 | 0.7720 | 0.7730 | 0.8595 | 0.9680 | 1.0777 | 1.3397 |
| 12 | 1.4326 | 1.1568 | 0.9198 | 0.9376 | 0.8422 | 0.8433 | 0.9376 | 1.0560 | 1.1757 | 1.4615 |
| 13 | 1.5520 | 1.2532 | 0.9964 | 1.0157 | 0.9124 | 0.9136 | 1.0157 | 1.1440 | 1.2736 | 1.5833 |
| 14 | 1.6714 | 1.3496 | 1.0731 | 1.0939 | 0.9826 | 0.9838 | 1.0939 | 1.2320 | 1.3716 | 1.7050 |
| 15 | 1.7908 | 1.4460 | 1.1497 | 1.1720 | 1.0528 | 1.0541 | 1.1720 | 1.3200 | 1.4696 | 1.8268 |

FIG. 21 SEGMENT LENGTHS OF EACH BEAM AT DIFFERENT DISTANCES FROM THE SENSOR

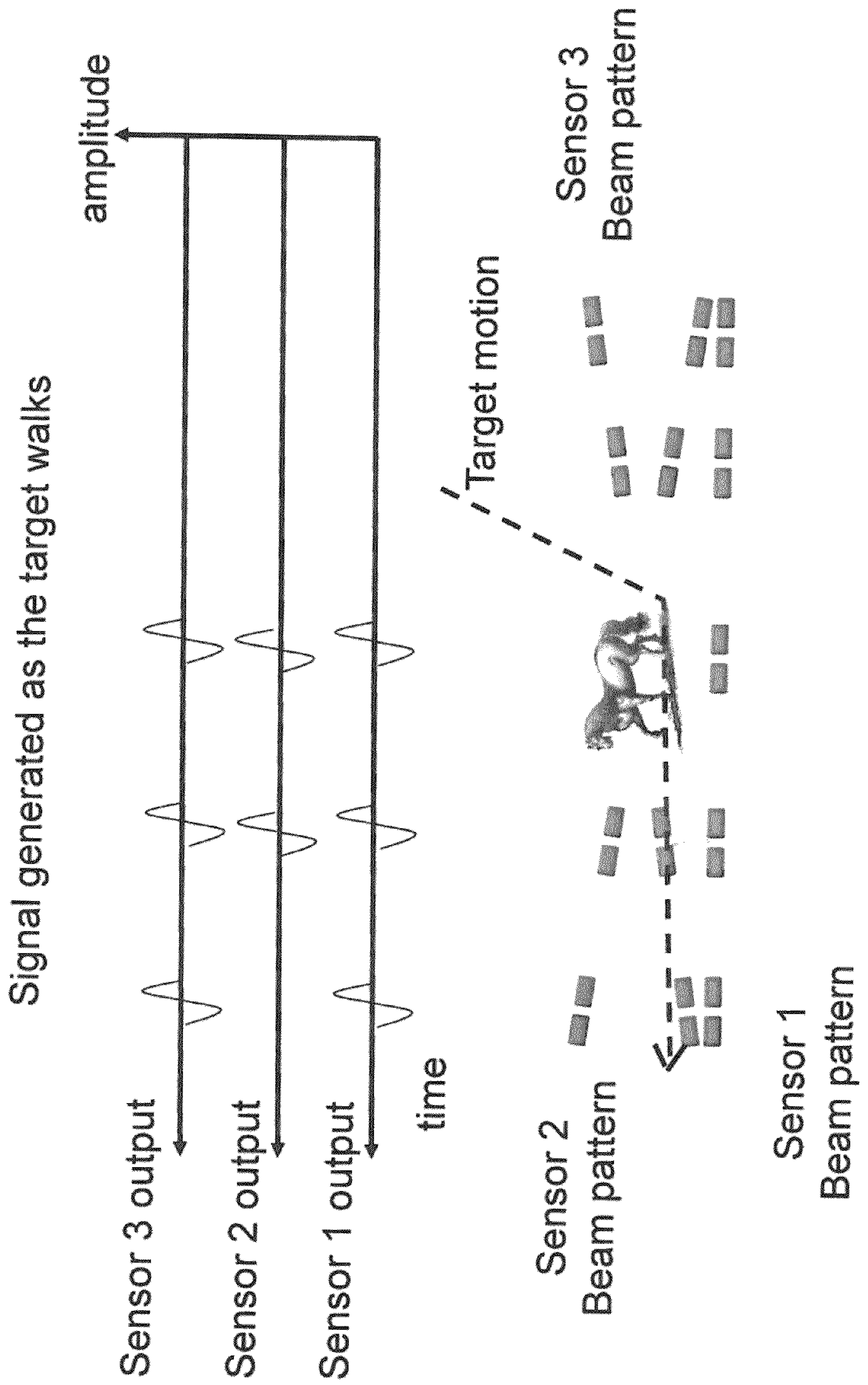
FIGURE 22. THREE PIR SENSORS

TARGET DETECTOR WITH SIZE DETECTION AND METHOD THEREOF

STATEMENT OF GOVERNMENT INTEREST

The embodiments herein may be manufactured, used, and/or licensed by or for the United States Government without the payment of royalties thereon.

BACKGROUND OF THE INVENTION

The present invention is directed target detection and detection of specific types of targets. Generally, when sensing a specific type of target, it is desirous to avoid the sensing of false alarms.

Generally speaking, it is advantageous to avoid false alarms generated in response to animals and the like when one desires to detect intruders to one's property or across a boundary. Although motion sensors are useful in sensing the motion of an animal or human, discrimination between, the two is generally left to visual recognition.

SUMMARY OF THE INVENTION

A preferred embodiment of the present invention is directed to a system for detecting targets comprising at least one first receiver for receiving radiation, the radiation comprises beams of radiation spaced horizontally; at least one second receiver for receiving radiation, the radiation comprises beams of radiation spaced horizontally and vertically such that the beams of radiation received by the second receiver travel through different, predetermined heights from the horizontal plane; at least one processor for receiving data from the first and second receivers, the at least one receiver operating to locate a target passing in the vicinity of the first and second receivers and determine the height of the target based upon the recordation of certain of the beams at a predetermined heights relative to the horizontal plane and the width of a target based upon the horizontal spacing of the beams.

A preferred embodiment comprises a system for detecting and discriminating targets comprising: at least one first receiver for receiving radiation above ground level spread in a horizontal and vertical direction; at least one second receiver for receiving radiation above ground level spread in a horizontal and vertical direction substantially at different heights than the at least one receiver such that the radiation received by the second receiver travels through a plane perpendicular to the ground level at heights differing from the radiation, received by at least one first receiver; at least one processor for receiving data from the first and second receivers, the at least one receiver operating to locate a target passing in the vicinity of the first and second receivers and determine the height of the target based upon the passage of the radiation at a calculated height relative to a perpendicular plane in which the target is determined to be located and the width of a target based upon, the width of the passage of radiation relative to a perpendicular plane in which the target is determined to be located. Optionally, the at least one of the at least one first and second receivers may comprise a series of receivers positioned at predetermined different heights relative to the ground and further comprise at least one first transmitter and at least one second transmitter for transmitting radiation to the at least one first and second receivers, respectively. Optionally, the series of receivers may be positioned at predetermined heights within the height range of animals that frequent the area of interest and above the height range of animals that frequent the area but within the height range of humans, the system using the information obtained by the receivers positioned at different heights to distinguish between the detection of an animal or human. Optionally, the radiation may be infrared and the first and second receivers may comprise first and second Fresnel lenses operatively associated with the at least one first and second receivers, the beams of radiation received by the Fresnel lens being received into a plurality of channels within the first, and second receivers, the beams of radiation received into channels of the second receiver originating at predetermined varying heights relative to the ground so that based upon the detection of radiation within the channels, the height and width of the target may be determined. The at least one second receiver may receive beams spread horizontally and vertically at different heights, such that as determined by the intersection of the beams with a plane perpendicular to the ground level and perpendicular to the direction of travel, the beams form an angle in the range of approximately 5 to 30° to the horizontal plane. Optionally, the beams of radiation received by the at least one first and second receivers may comprise sub-beams having positive and negative polarity, the positive and negative polarity of the sub-beams resulting in voltages generated by the at least one first and second receivers are proportional to the distance to the target and whereupon based on the voltages in conjunction with predetermined set of calibration values; the range of the target is estimated by the at least one processor and based upon data received from the at least one first and second receivers, the approximate height and width of the target is computed.

A method of target detection comprising;

obtaining data from at least one upper and lower receivers; the at least one upper or lower receiver adapted to receive a light beam that is further to the left that leftmost beam received by the other of the at least, one receiver;

estimating the voltage difference between the at least one upper and lower receivers for each beam of radiation received using at least one processor operatively connected to and receiving signals from the at least one upper and lower receivers;

based on the voltage difference, estimating the range using a set of predetermined calibration values;

if the range is less than a first predetermined distance then it is short range else it is long range;

determining the direction of motion of the target depending whether the at least one lower receiver or the at least one upper receiver generates the signal first; such that if the at least one receiver that is adapted to receive a light beam further to the left generates a signal first, the target is moving from left to right; and if the at least one receiver that is adapted to receive a light beam further to the right generates a signal first, the target is moving from right to left;

using the at least one processor, estimating the height of the target depending on the highest beam pattern of the upper receiver that is effected by the target;

if the range is short, determining the number of beams the target occupies depending on how many times the slope of the signal to the processor is changed mid stream;

if the range is long, determining the times $t_1$ and $t_2$ when signal crosses the average for both the at least one upper and lower receivers;

based on the time difference between times $t_1$ and $t_2$ and the distance between the two beams using equation $$v = \frac{D_b}{t_5 - t_1},$$

estimating the time '$t_2$' it takes the signal to peak for the at least one tipper or lower receiver for which '$t_1$' is estimated;

using the equation $B_w+2W=v(t_2-t_1)$, where $B_w$ is the width of the positive beam, and W is the length or width of the target, depending upon the origination of the beam, and where v is the speed at which the target is moving and the distance the target covered during the time period $t_2-t_1$ is $v(t_2-t_1)$, estimating the length and width of the target.

BRIEF DESCRIPTION OF THE DRAWINGS

The embodiments herein will be better understood from the following detailed description with reference to the drawings, in which:

FIG. 1A illustrates diagrammatically horizontal and slant beam patterns viewed from a standpoint parallel to the horizontal or ground generated in accordance with the principles of the present invention.

FIG. 1B illustrates diagrammatically an elevation view of horizontal and slant beam patterns generated in accordance with the principles of the present invention.

FIG. 1C schematically illustrates a hypothetical transmitter and receiver combination capable of producing one of the sets of beam patterns of FIGS. 1A and 1B.

FIG. 2A illustrates diagrammatically a top view of a Fresnel lens array beam pattern generated in accordance with the principles of the present invention.

FIG. 2B illustrates diagrammatically a side view of a Fresnel lens array beam pattern generated in accordance with the principles of the present invention.

FIG. 2C illustrates diagrammatically a front view of a Fresnel lens array beam pattern generated in accordance with the principles of the present invention.

FIG. 3 illustrates diagrammatically a Pyroelectric Passive Infrared Sensor/Detector/Transmitter 10 with Fresnel lens array 11.

FIG. 4 is a schematic illustration of a Pyroelectric Passive Infrared Detector (sensor) mounted within a protective case 12.

FIG. 5 is a schematic illustration of an exemplary circuit diagram of the sensing circuitry of a preferred embodiment.

FIG. 6 is an illustration showing a black body radiation curve produced by a graph of wavelength versus power density for a human body at 37 degrees Celsius.

FIG. 7 is a schematic diagram showing a heat source (source such as a human or an animal) moving across the beam patterns produced by a preferred embodiment and the output signal generated.

FIG. 9 illustrates diagrammatically two views of exemplary beam patterns provided in accordance with principles of the present invention.

FIG. 10 is a three-dimensional diagram of slightly misaligned beam patterns provided in accordance with principles of the present invention.

FIG. 11 is an exemplary graph of signals generated by a person walking left to right and right to left.

FIG. 12 is an exemplary graph of time (in seconds) versus voltages from the side beams less than the central beam (since the voltages generated by the bottom and top PIR sensors are proportional to the distance, the difference between the voltages can be used to estimate the distance).

FIG. 13 is a schematic illustration depicting a horse walking in the direction shown (linear) through the beam, patterns produced by a preferred embodiment.

FIG. 14 is a schematic illustration depicting a horse walking in the direction shown (curved) through the beam patterns produced by a preferred embodiment.

FIG. 15 illustrates a graphical comparison of a person walking through a beam pattern produced by a preferred embodiment in comparison to a horse walking through a beam pattern produced by a preferred embodiment.

FIG. 18 is a schematic illustration depicting the width of a beam at a distance from the transmitter/sensor of a preferred embodiment.

FIG. 17 is a schematic illustration depicting a horse walking through the beam patterns produced by a preferred embodiment wherein the horse's length is greater than two beam patterns.

FIG. 18 is a schematic illustration depicting the dynamics of signal generation as a target moves across the beams.

FIG. 19 is a schematic illustration depicting the dynamics of signal generation for bottom and top PIR transmitter/sensors.

FIG. 20 is a flowchart for a preferred embodiment algorithm to determine whether the target is a human or animal.

FIG. 21 is an illustration of a table showing segment lengths of each beam at different distances from the sensor/transmitter.

FIG. 22 is an illustration of a preferred embodiment utilizing three PIR sensors.

DETAILED DESCRIPTION OF PREFERRED EMBODIMENTS

Figure 8:
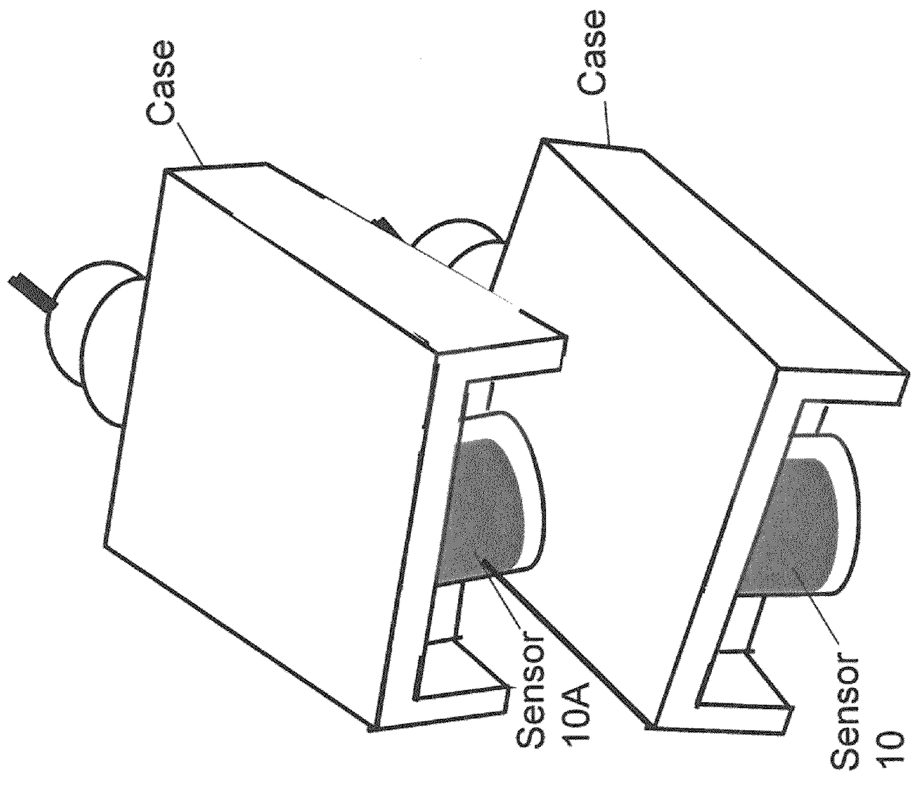
FIG. 8 is a schematic illustration of the positioning of two Pyroelectric Passive Infrared Detectors (sensors) mounted within protective cases 12 in accordance with the principles of the present invention.

The embodiments of the invention and the various features and advantageous details thereof are explained more folly with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skilled in the art to practice the embodiments of the invention. Accordingly, the examples should not be construed as limiting the scope of the embodiments of the invention.

The terminology used herein is for the purpose of describing particular embodiments only and is not intended to limit the full scope of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element such as an object, layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present, it will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be understood that, although the terms first, second, etc. may be used herein to describe various elements, components, regions, layers and/or sections, these elements, components, regions, layers and/or sections should not be limited by these terms. For example, when referring first and second photons in a photon pair, these terms are only used to distinguish one element, component, region, layer or section from another region, layer or section. Thus, a first element, component, region, layer or section discussed below could be termed a second element, component, region, layer or section without departing from the teachings of the present invention.

Furthermore, relative terms, such as "lower" or "bottom" and "upper" or "top," may be used herein to describe one element's relationship to other elements as illustrated in the Figures. It will be understood that relative term's are intended to encompass different orientations of the device in addition to the orientation depicted is the Figures. For example, if the device in the Figures, is turned over, elements described as being on the "lower" side of other elements would then be oriented on "upper" sides of the other elements. The exemplary term "lower", can therefore, encompass both an orientation of "lower" and "upper," depending of the particular orientation of the figure. Similarly, if the device in one of the figures is turned over, elements described as "below" or "beneath" other elements would then be oriented "above" the other elements. The exemplary-terms "below" or "beneath" can, therefore, encompass both an orientation of above and below. Furthermore, the term "outer" may be used to refer to a surface and/or layer that is farthest away from a substrate.

Embodiments of the present invention are described herein with reference to cross-section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region or object illustrated as a rectangular will, typically, have tapered, rounded or curved features. Thus, the regions illustrated in the figures are schematic in nature and their shapes are not intended to illustrate the precise shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will also be appreciated by those of skill in the art that references to a structure or feature that is disposed "adjacent" another feature may have portions that overlap or underlie the adjacent feature.

The present invention provides an instrument that is capable of detecting people and animals and discriminating between the two species. A preferred embodiment utilizes two motion detectors, which are commercially available, in conjunction with Fresnel lens arrays: one is installed such that the Fresnel array pattern is horizontal to the ground and the other motion detector installed on top of the First one such that the Fresnel array pattern is at an angle of 5-30° to the horizontal plane. Note that the use of motion detectors is described for the purposes of example only and the present invention is not limited to the use of motion detectors. The preferred embodiment comprises a computer or processor system (such as a laptop) that can capture the data from both the sensors and perform processing steps to determine whether the target is a human being or an animal. A flow chart for the processing steps is illustrated at FIG. 20 and the details of each step involved in determining whether it is an animal or a human are elaborated. However, the principles of the present invention are not limited to the processing steps of FIG. 20 and other algorithms may be used without departing from the scope of the present invention.

A preferred embodiment provides an estimate of the width and height of a target using two pyroelectric sensors. Based on the width and height one can determine whether the target is art animal or a human being with substantial accuracy. FIGS. 1A and 1B show two sets of parallel beams constructed in accordance with the principles of the present invention; one set being arranged horizontally and the second set being arranged at a slant angle so that the upper beam is at a height of 2 m from the ground or base level. In this example, the spacing between each beam is approximately 15 cm. Assuming that at one end of each, beam there is a transmitter and at the other end there is a receiver as depicted in FIG. 1C, if an animal (depicted as a dog) walks across the beams of FIG. 1A, the animal intercepts 'n' number of horizontal beams, which can be observed by the lack of signal at n number of receivers. The separation between n number of beams provide the width/length of the target. As the animal moves, it intercepts the slant beams also. The highest beam it intersects gives the height of the target. Accordingly, one can estimate the height and width/length of the target. For example, a person has a height of 5' 9" and a width, of 1' 4". Similarly, horse may be 7' long and 0.6' tall. Based on these dimensions, through beam intersection, one can determine the target type, or with, more accuracy whether or not it is a person.

Generation of parallel beams requires the transmitters to be spaced apart and the receivers to detect the signal require the sensors to be spaced accordingly. Instead of parallel beams, one can use a fen shaped beams as shown in FIGS. 2A-C. Instead of using both transmitters and receivers, a receiver is utilized which receives emissions from the target. For practical reasons, two pyroelectric passive infrared (PIR) sensors are utilized, one for horizontal fan shaped beam pattern to generate the horizontal beams and another PIR sensor to generate the slant shaped beam patterns.

A preferred embodiment of the present invention utilizes two pyroelectric passive infrared (PIR) motion detection sensors. One of the sensors is shown in FIG. 3 with a Fresnel lens in front of it FIG. 4 shows one of the PIR sensors 10 in a protective package. The circuit diagram used with the sensor elements to observe the voltage generated by the pyroelectric sensing elements provided, by one of the vendors is shown in FIG. 5. The pyroelectric sensing elements are connected back to back as shown in FIG. 5. Connecting the sensors 10, 10A "back to back" results in output that is proportional to the difference between the two sensors. Hence, in effect it cancels the variations due to atmospheric temperature changes. These elements are marked as positive and negative, as shown in FIG. 3, wherein the positive terminal of sensor 10 is connected to the positive terminal of sensor 10A. FIG. 5 comprises a resistor 12, FET transistor 13 comprising source and drain terminals which connect to terminals S and D respectively, resistor 14 and capacitor 15. Other circuitry and/or circuitry elements may be utilized without departing from the scope of the present invention. The detectors 10, 10A used in conjunction with the preferred embodiments may include Fresnel lenses, commonly used in conjunction with COTS (commercial off the self) units. A Fresnel lens can be thought of as regular convex lenses, but one that has been collapsed on itself to form a thinner, lighter, flat lens; one that still retains the optical characteristics of the larger convex lens, as depicted in the upper right portion of FIG. 7. The key advantage is that the segments of the Fresnel lens separate incoming light into distinct channels, and these, ultimately gather at the pyroelectric sensor elements (in a manner analogous to wooden slats of a simple hand fan). The objective is to gather incoming light from, each of the channels that provide distinct information about the target (or object). Many different Fresnel lenses are available on the market. The Fresnel lens shown in FIG. 4 divides, incoming light into five double channels (C1-C2, C3-C4, C5-C6, C7-C8, C9-C10, with one sub-channel (e.g. C1) corresponding to the positive element and the other (e.g. C2) corresponding to the negative element. Other lenses and/or number of channels may be utilized as is readily apparent to one of ordinary skill in the art without departing from the scope of the present invention.

The different Fresnel lens arrays that can be utilized in conjunction with a preferred embodiment of the present invention are available from commercial sources. FIG. 2A diagrammatically illustrates a Fresnel lens array that is used in conjunction with a preferred embodiment of this invention, comprising 10 subchannels labeled C1-C10. However, other Fresnel lens arrays can be used with minor or no modification in the human and animal, discrimination algorithm. The Fresnel lens array shows five double beams, each separated by approximately 20°. As depicted schematically in FIG. 2A, each beam pattern has two sub-beams (e.g., C1 and C2); one sub-beam corresponding to the positive element, another sub-beam corresponding to the negative element (as depicted in FIG. 3). FIG. 2B is a diagrammatic illustration of the positioning of a sensor at a height of one meter. However, the sensor may be positioned at a variety of levels and/or positions without departing from the scope of the present invention.

Human and/or animal body is a source of thermal radiation. The blackbody radiation pattern of a person at a temperature 37° C. is shown in FIG. 6. Maximum radiation from a human body occurs around 9500 ran wavelength. Similar radiation patterns can be observed for animals. The pyroelectric sensors are optimized to detect the radiation from 8000 to 14000 nm. When a heat source (source such as a human or an animal) moves across the beam patterns as shown in FIG. 7, an output voltage is generated. When the heat source moves into the positive element of the sensor, a positive voltage is generated at the output of the sensor. Similarly a negative voltage is generated when the heat source moves across the negative element of the sensor as shown in FIG. 7.

A preferred embodiment, of the present invention involves use of two pyroelectric passive infrared sensors, one above the other sensor, as shown in FIG. 8. The beam patterns of both the sensors are shown in FIG. 9. From the front view, the beam pattern of the sensor at the bottom, is horizontal to the ground and the beam pattern of the top sensor is at a slope. As a result, the height at which the beams occur increases from one side to the other as shown in FIG. 9. Discrimination of humans and animals is done by estimating the width/length and height of each, target, namely, humans and animals. The bottom sensor is used to estimate the width or length of the target and the top sensor is used to estimate the height of the target.

From the bottom sensor output; one can easily estimate the direction of motion of the target. Since, each beam pattern is assigned positive and negative signs as shown in FIG. 7, depending on whether positive signal appears first, followed by a negative signal or vice versa the direction of motion can be ascertained. If the sensor is installed such that the beam patterns are '+ – +– . . . +–' from right to left with respect to the sensor, then a positive signal followed by a negative signal implies the target is moving from, right to left. Similarly, a negative signal followed by a positive signal implies the target is moving from left to right with respect to the sensor. The same information can be ascertained using the top sensor's output as long as the sensor is able to receive the radiation from the target. Another way to determine the direction of motion of the target is to stagger (misalign) the beam patterns of bottom and top PIR sensors as shown in FIG. 10. When a target walks from left to right; first signals appear on die bottom sensor and then on the top sensor since the target intercepts the beam pattern of the bottom sensor first and then the beam pattern of the top sensor. Similarly; if the target moves from right to left then the signals appear first on the top sensor and then on the bottom sensor. FIG. 11 shows the signals captured from bottom and the top sensor when a person walked across the sensor beams patterns left to right and right to left.

Range Estimation:

The Fresnel Array beam pattern has a fan shape as shown in FIG. 2A. In the case of two detectors 10, 10A, due to the fan shape (as depicted in FIG. 9, for example), the separation between one beam to other varies with distance, as depicted schematically in FIG. 13. Hence, to estimate the length/width of the target it is necessary to know where the target is crossing the beam pattern. Similarly, the height of the beam patterns of the top PIR sensor varies with distance and one needs to know the range of the target to estimate the height (see, e.g., eight feet high location shown in FIG. 9). Hence, in order to estimate the height and length/width estimation of the target, one should first estimate the distance of the target from the PIR sensor 10 or 10A. The PIR sensor 10 outputs a voltage proportional to the radiation it receives. The radiation impinging on the sensor 10 (or 10A) is inversely proportional to the square of the distance and hence the output voltage of the PIR sensor 10 (or 10A) is given by equation 1

$$V \propto \frac{1}{R^2}$$

where R is the distance between the target and the sensor. Since the top PIR sensor 10A is mounted such that its beams are at an angle from the horizontal plane; these beams are at a height compared to the beams of the bottom PIR sensor 10. Hence, the target intersecting the top beam patterns have a longer path compared to the bottom beam patterns. Hence, the radiation intersecting the top beam patterns have $R_{top} > V_{bottom}$ and hence from equation 1, the voltage from the bottom PIR sensor will be higher than the voltage from the top PIR sensor ($V_{bottom}$>$V_{top}$). It is evident that $V_{bottom}$>$V_{top}$ from FIG. 11. Due to the fact that the beam patterns are in a fan shape, the beams which are at the center impinge on the sensor directly, while the one on either side of the center impinge at an angle on the sensor. Hence, the voltage at the output of the sensor also varies as shown in FIG. 12. Since, the voltages generated by the bottom and top PIR sensors are proportional to the distance, the difference between the voltages can be used to estimate the distance. For a given Fresnel lens array beam patterns it is better to calibrate them and generate a table giving die voltage difference between the outputs of the two sensors and distance as shown in an example given by Table 1. Note, the numbers in Table 1 are not exact, the actual values can be obtained by equation 1 or by calibration.

TABLE 1

Difference in outputs versus distance

| Difference in voltages (volts) | Distance from the sensors (meters) |
|---|---|
| 0.1 | 1 |
| 0.5 | 6 |
| . . . | |
| . . . | |
| 0.8 | 10 |

The intermediate beam patterns (e.g., S2-S9) are at different heights and can be easily calculated using the slope of the top sensor with horizontal plane and knowing the separation between the beam patterns of the top sensor. Assume that a target is walking from, right to left. As the target walks across the beam patterns, a signal is generated at the output of each sensor. Top sensor's output is shown in FIG. 13 as time versus amplitude. FIG. 13 also shows the target intersecting a beam pattern that is at the same height as the target. Hence, approximate height of the target can be estimated based on the highest beam pattern of the top sensor the target intersects.

In general, these sensors are deployed such that they are looking across a pathway, that is the central beam pattern is at 90° to the pathway. However, if the target deviates from the path and approaches the sensor at an angle as shown in FIG. 14, the height of the target can be estimated using both the sensors outputs. The bottom sensor gives the direction of the target.

Determination of the Length or Width of the Target.

Now, the length or width of the target will be determined. Typical waveforms observed when a person or an animal walking across the beam patterns, of a PIR sensor are shown in FIG. 15. Two approaches are used to estimate the length/width of the target. If the target is crossing the beam at a close distance we use one approach. When it is crossing the beams at a distance, we use the second approach. FIG. 16 shows the width of the beam.

TABLE 2

Segment lengths of each beam at different distances from the sensor.

| Dist. from sensor (m) | beam 1 + (m) | beam 1 − (m) | beam 2 + (m) | beam 2 − (m) | beam 3 + (m) | beam 3 − (m) | beam 4 + (m) | beam 4 − (m) | beam 5 + (m) | beam 5 − (m) |
|---|---|---|---|---|---|---|---|---|---|---|
| 1 | 0.1194 | 0.0964 | 0.0766 | 0.0781 | 0.0702 | 0.0703 | 0.0781 | 0.0880 | 0.0980 | 0.1218 |
| 2 | 0.2388 | 0.1928 | 0.1533 | 0.1563 | 0.1404 | 0.1405 | 0.1563 | 0.1760 | 0.1959 | 0.2436 |
| 3 | 0.3582 | 0.2892 | 0.2299 | 0.2344 | 0.2106 | 0.2108 | 0.2344 | 0.2640 | 0.2939 | 0.3654 |
| 4 | 0.4775 | 0.3856 | 0.3066 | 0.3125 | 0.2807 | 0.2811 | 0.3125 | 0.3520 | 0.3919 | 0.4872 |
| 5 | 0.5969 | 0.4820 | 0.3832 | 0.3907 | 0.3509 | 0.3514 | 0.3907 | 0.4400 | 0.4899 | 0.6089 |
| 6 | 0.7163 | 0.5784 | 0.4599 | 0.4688 | 0.4211 | 0.4216 | 0.4688 | 0.5280 | 0.5878 | 0.7307 |
| 7 | 0.8357 | 0.6748 | 0.5365 | 0.5469 | 0.4913 | 0.4919 | 0.5489 | 0.6160 | 0.6858 | 0.8525 |
| 8 | 0.9551 | 0.7712 | 0.6132 | 0.6251 | 0.5615 | 0.5622 | 0.6251 | 0.7040 | 0.7838 | 0.9743 |
| 9 | 1.0745 | 0.8676 | 0.6898 | 0.7032 | 0.6317 | 0.6325 | 0.7032 | 0.7920 | 0.8817 | 1.0961 |
| 10 | 1.1938 | 0.9640 | 0.7665 | 0.7813 | 0.7018 | 0.7027 | 0.7813 | 0.8800 | 0.9797 | 1.2179 |
| 11 | 1.3132 | 1.0604 | 0.8431 | 0.8595 | 0.7720 | 0.7730 | 0.8595 | 0.9680 | 1.0777 | 1.3397 |
| 12 | 1.4326 | 1.1568 | 0.9198 | 0.9376 | 0.8422 | 0.8433 | 0.9376 | 1.0560 | 1.1757 | 1.4615 |
| 13 | 1.5520 | 1.2532 | 0.9964 | 1.0157 | 0.9124 | 0.9136 | 1.0157 | 1.1440 | 1.2736 | 1.5833 |
| 14 | 1.6714 | 1.3496 | 1.0731 | 1.0939 | 0.9826 | 0.9838 | 1.0939 | 1.2320 | 1.3716 | 1.7050 |
| 15 | 1.7908 | 1.4460 | 1.1497 | 1.1720 | 1.0528 | 1.0541 | 1.1720 | 1.3200 | 1.4696 | 1.8268 |

Height Estimation:

Assuming that the first sensor (bottom sensor) 10A with horizontal beam pattern is placed at a height of 1 foot from the ground (instead of 1 m), as depicted in FIG. 2B. This means ail the targets with height less than 1 foot will not be detected by the bottom sensor since the Fresnel lens array used is a small animal alley lens. However, by lowering the height of the sensor one can detect the targets with height less than 1 foot using the bottom sensor. Consider the beam pattern of the top sensor. It is at a slope or angle to the horizon. As shown in FIG. 9, the beam pattern that is closest to the ground is at 1 foot. The beam pattern (S1 to S10) that is at angle to the horizontal (or ground) as shown in FIG. 9, so that the farthest beam S10 is at a height of 8 feet at a predetermined distance.

Case 1: The Width of the Beam is Smaller than the Length/Width of the Target:

Since the target length/width is greater than the width of the beam, the target touches two beams simultaneously as shown in FIG. 17. This happens when the target distance to the sensor is small and hence the beam widths are small. When this happens, the waveform generated by the sensor changes its slope midway as shown in FIG. 17, that is, if the waveform is decreasing from a positive peak, it starts increasing in the midstream. The change is also seen in the actual data collected for a horse in FIG. 15(*b*). When the slope change happens, the length/width of the target is at least the total width of beams '+−' or '−+' of the two adjacent zones. Since the range is known, as described earlier, the beam widths can be found from the Table 2. If the beam number is not known, average beam width at the range can be used to estimate the length/width of the target. Often, length/width of the target is enough to decide whether the target is human or not. If length/width is not enough to determine whether the target is human or not, the height, information can be used.

Case 2: The Width of the Beam is Greater than the Length/Width of the Target:

This is the case when the target is farther away from the sensor. FIG. 18 shows one positive and associated negative beams of Fresnel array and a moving target that moves across the beams from left to right. As the target moves, a waveform is generated at the output of the PIR sensor as shown in FIG. 18. During the periods '$t_1$' and '$t_2$' the target is in touch with the positive beam and hence a positive signal is being generated at the output of the sensor. Actual shape of the signal depends on the gain settings used for the output. Whatever is the shape of the signal, it will be positive. During the time periods '$t_2$' and '$t_3$' the target is not in any beam and hence the signal discharges. Similarly, during the time periods '$t_3$' and '$t_4$' when the target is touching the negative beam a negative signal appears. If we assume the speed at which the target is moving as 'v', then the distance it covered during the time period $t_2-t_1$ is $$B_w+2W=v(t_2-t_1) \qquad (2)$$

where $B_w$ is the width of the positive; beam where the target is crossing and W is the length/width of the target. The beam width Bw is known, hence if one knows the velocity at which the target is moving the length/width, of the target can be estimated from equation 2. In order to estimate the velocity v, we refer to FIG. 19. The signal from, the bottom PIR sensor starts raising as soon as the target touches its positive beam. Similarly, the signal for the top PIR sensor starts raising as soon as the target touches its positive beam as shown in FIG. 19. The distance $D_b$ between the two corresponding positive beams of the top and bottom PIR sensors can be determined from geometric principles. The time it takes the target to travel the distance $D_b$ is $t_5-t_1$, where $t_1$ and $t_5$ are the times when the signals starts rising from quiescent, state for the bottom and top PIR sensors respectively as shown in FIG. 19. Hence, the speed at which the target is traveling can be estimated by $$v = \frac{D_b}{t_5 - t_1}. \qquad (3)$$

In order to determine whether the target is human or an animal, a preferred embodiment comprises an algorithm comprising the steps given below. These steps are also shown as a flow chart in FIG. 20.

FIG. 22 is an illustration of another preferred embodiment in accordance with the principles of the present invention. FIG. 22 shows the beam patterns of three PIR sensors with third sensor placed on top the two sensors. The 3rd sensor Fresnel zones are at slant angle similar to that of the 2nd sensor but the slant angle rises in the opposite direction compared to that of 2nd sensor. This configuration facilitates the detection of height of the target going on either side of the trail. For example, consider FIG. 14 where the target enters in the middle and walking to the left. However, if the target walks to the right, then finding the height would be difficult as the beams are at lower height than the target. Hence, having an optional third sensor with the beam patterns rising to the right would provide the height of the target. If the device is placed at a place where the targets walk on a road or a trail, then only two PIR sensors are enough. However, if the targets can move in ail directions, then three PIR sensor configuration is preferable.

Algorithm:

Get the data from both bottom and top PIR sensors

Estimate the voltage difference between the two sensors at each beam. Based on the voltage difference estimate the range using the calibration Table 1. Some interpolation of the table data may be needed to find the range.

If the range is less than 3 m then it is short range else it is long range (short or long range depends on the Fresnel lens array and number of beam patterns)

Determine the direction of motion of the target depending whether the bottom or the top PIR generates the signal first. If the bottom sensor generates first (assuming that the bottom PIR has its far left beam is left to the top PIR sensors left most beam), the target is moving from left to right. Similarly, if the top sensor generates its output first, then the target is moving from right to left.

Estimate the height of the target depending on the highest beam pattern the target touches depending on the signal. Assuming that the target is going on the path at least part of the way as shown in FIG. 14. (It is possible to create other variations of the invention with three PIR sensors as shown in FIG. 22.)

If the range is short, determine the number of beams the target occupies depending on how many times the slope of the signal changed mid stream.

If the range is long, determine the times '$t_1$' and '$t_5$' when signal crossing the average for both the PIR sensors. Based on the time difference between these times and the distance between the two beams using equation 3.

Estimate the time '$t_2$' it takes the signal to peak for the sensor for which '$t_1$' is estimated. Use equation 2 to estimate the length/width of the target If the length/width is between 1 to 1.5 ft and height is about 5 feet, declare the target as human, else declare it as animal.

As used herein, the terminology "target" means a person or persons, or portion thereof, animal or animals, thing, object, vehicle or a combination thereof.

As used herein the terminology "point of interest" or "points, of interest" refer to an area or region in which there appears to be a target (or could potentially have a target) but may or may not be a target (or contain a target); e.g., potentially the point of interest may be an area or region containing an animal or human.

As used herein the terminology "area of interest" or "region of interest" refer to an area or region in which the monitoring is to take place. For example, potentially the area or region, of interest may be an area or region containing an animal or human.

As used herein the terminology "processor" includes computer, controller, CPU, microprocessor; multiprocessor, minicomputer, main frame, personal computer, PC, coprocessor, and combinations thereof or any machine similar to a computer or processor which is capable of processing algorithms.

As used herein the terminology "beam pattern" means the shape of an incoming or outgoing array of channels of radiation inputted into, for example, a Fresnel lens. The beam pattern, need not be formed from distinct subchannels or channels as the beam pattern may be one contiguous beam which is divided into channels by the receiving means.

As used herein the terminology the terminology "process" means: an algorithm, software, subroutine, computer program, or methodology.

As used herein the terminology "target signature" means the characteristic pattern of a target displayed by detection and identification equipment.

As used herein, the terminology "algorithm" means; sequence of steps using computer software, process, software, subroutine, computer program, or methodology.

As used herein, the terminology "predetermined different heights" means, with respect to receivers and/or transmitters, at heights measured from ground or base level which differ from one another, including an incremental difference or a predetermined random difference in height. In the case where a series of receivers are positioned at predetermined different, heights, all of the first receivers or all of the second receivers need, not be at different heights.

As used herein, the terminology Fresnel lens or Fresnel Array means a type of lens that allows the construction of lenses of large aperture and short focal length without the mass and volume of material that would be required by a lens of conventional design. The Fresnel lens may be divided into a set of concentric annular or shaped, sections known as "Fresnel zones." See, Wikipedia in this regard. These "Fresnel zones" form what is referred to as an array or channels herein. Each zone may comprise a separate prism. The Fresnel lens may be single piece of glass or many small pieces. The Fresnel lens may be effectively divide the continuous surface of a standard lens into a set of surfaces of the same curvature, with stepwise discontinuities between them, forming the zones or channels. One type of Fresnel lens can be regarded as an array of prisms arranged in a circular fashion, with steeper prisms on the edges and a nearly flat convex center.

As used herein, the terminology "horizontal plane" includes the ground level or a base positioned substantially parallel to the ground.

As used herein, the terminology "predetermined set of calibration values" may comprise a table of calibration values such as that depicted in FIG. 21 but is not limited to such a table.

The foregoing description of the specific embodiments are intended to reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that, the embodiments herein can be practiced with modification within the spirit and scope of the appended claims.

The invention claimed is:

1. A system for detecting targets comprising:

at least one first receiver for receiving radiation emitted by a passing animal or human, the radiation received by the at least one first receiver comprising-beams of radiation spaced horizontally;

at least one second receiver for receiving radiation emitted by a passing animal or human, the radiation received by the at least one second receiver comprising beams of radiation spaced horizontally and vertically such that the beams of radiation received by the at least one second receiver travel at different predetermined heights relative to the horizontal plane, wherein the radiation is received by each of the at least one first and second receivers through a Fresnel array having a plurality of channels; the Fresnel array of the at least one second receiver being inclined at an angle to the horizontal plane resulting in channels at different vertical and horizontal locations; and at least one processor for receiving data from the at least one first and second receivers, the at least one processor operating to locate a target passing in the vicinity of the at least one first and second receivers and approximating the height and width of a target based upon radiation entering the plurality of channels at differing vertical and horizontal locations; the height of the target being based upon the recordation of certain of the beams at a predetermined heights relative to the horizontal plane and the width of a target based upon the horizontal spacing of the beams.

2. The system of claim 1 wherein the beams of radiation entering the at least one first and second receivers through Fresnel arrays comprise positive and negative sub-beams, wherein based upon the polarity of the signal received by the at least one first and second receivers, the distance from the at least one first and second receivers to the target is determined.

3. The system of claim 1 wherein the at least one of the at least one first and second receivers comprises at least three receivers positioned at predetermined different heights relative to the ground.

4. A system for detecting targets comprising:

at least one first receiver for receiving infrared radiation, the infrared radiation received by the at least one first receiver comprising-beams of radiation spaced horizontally;

at least one second receiver for receiving infrared radiation, the infrared radiation received by the at least one second receiver comprising beams of radiation spaced horizontally and vertically such that the beams of radiation received by the at least one second receiver travel at different predetermined heights relative to the horizontal plane; the at least one first and second receivers comprising first and second Fresnel lenses operatively associated with the at least one first and second receivers, the beams of radiation received by the Fresnel lenses being received into a plurality of channels within the at least one first and second receivers, the beams of radiation received into channels of the at least one second receiver originating at varying heights relative to the ground, such that as determined by the intersection of the beams with a plane perpendicular to the ground level and perpendicular to the direction of travel, the cross sections of the channels are at an angle in the range of approximately 5 to 30° to the horizontal plane, so that based upon the detection of radiation within the channels, the height and width of the target may be determined; and at least one processor for receiving data from the at least one first and second receivers, the at least one processor operating to locate a target passing in the vicinity of the at least one first and second receivers and determine the height of the target based upon the recordation of certain of the beams at a predetermined heights relative to the horizontal plane and the width of a target based upon the horizontal spacing of the beams.

5. A system for detecting targets comprising:

at least one first receiver for receiving radiation, the radiation received by the at least one first receiver comprising-beams of radiation spaced horizontally;

at least one second receiver for receiving radiation, the radiation received by the at least one second receiver comprising beams of radiation spaced horizontally and vertically such that the beams of radiation received by the at least one second receiver travel at different predetermined heights relative to the horizontal plane, wherein the at least one second receiver receives beams spread horizontally and vertically at different heights, such that as determined by the intersection of the beams with a plane perpendicular to the ground level and perpendicular to the direction of travel, the beams form an angle in the range of approximately 5 to 30° to the horizontal plane; and at least one processor for receiving data from the at least one first and second receivers, the at least one processor operating to locate a target passing in the vicinity of the at least one first and second receivers and determine the height of the target based upon the recordation of certain of the beams at a predetermined heights relative to the horizontal plane and the width of a target based upon the horizontal spacing of the beams.

6. The system of claim 5 wherein the beams of radiation received by the at least one first and second receivers comprise sub-beams having positive and negative polarity, the positive and negative polarity of the sub-beams resulting in voltages generated by the at least one first and second receivers that are proportional to the distance to the target and whereupon based on the voltages in conjunction with predetermined set of calibration values; the distance to the target is estimated by the at least one processor and based upon data received from the at least one first and second receivers, the approximate height and width of the target is computed.

7. A system for detecting and discriminating targets comprising:

at least one first receiver for receiving infrared radiation above ground level spread in a horizontal and vertical direction;

at least one second receiver for receiving infrared radiation above ground level spread in a horizontal and vertical direction substantially at different heights than the at least one first receiver such that the radiation received by the at least one second receiver travels through a plane perpendicular to the ground level at heights differing from the radiation received by at least one first receiver; the first and second receivers comprising first and second Fresnel lenses operatively associated with the at least one first and second receivers, radiation received by the Fresnel lens being received into a plurality of channels within the first and second receivers, the radiation received into channels of the second receiver originating at predetermined varying heights relative to the ground, such that as determined by the intersection of the beams with a plane perpendicular to the ground level and perpendicular to the direction of travel, the cross sections of the channels are at an angle in the range of approximately 5 to 30° to the horizontal plane; and at least one processor for receiving data from the at least one first and second receivers, the at least one processor operating to locate a target passing in the vicinity of the at least one first and second receivers, and based upon the detection of radiation within the channels, the height and width of the target may be determined, the height of the target being based upon the passage of the radiation at a calculated height relative to a perpendicular plane in which the target is determined to be located and the width of a target based upon the width of the passage of radiation relative to a perpendicular plane in which the target is determined to be located.

8. A system for detecting and discriminating targets comprising:

at least one first receiver for receiving radiation above ground level spread in a horizontal and vertical direction;

at least one second receiver for receiving radiation above ground level spread in a horizontal and vertical direction substantially at different heights than the at least one first receiver such that the radiation received by the at least one second receiver travels through a plane perpendicular to the ground level at heights differing from the radiation received by at least one first receiver such that, as determined by the intersection of the beams with a plane perpendicular to the ground level and perpendicular to the direction of travel, the different heights form an angle in the range of approximately 5 to 30° to the horizontal plane; and at least one processor for receiving data from the at least one first and second receivers, the at least one processor operating to locate a target passing in the vicinity of the at least one first and second receivers and determine the height of the target based upon the passage of the radiation at a calculated height relative to a perpendicular plane in which the target is determined to be located and the width of a target based upon the width of the passage of radiation relative to a perpendicular plane in which the target is determined to be located.

9. The system of claim 8 wherein each Fresnel array is positioned such that radiation entering each of at least one first and second receivers passes through the Fresnel arrays.

10. The system of claim 8 wherein data is inputted from the at least one first and second receivers into the at least one processor and based upon the inputted data the system determines whether the target is a human or an animal and wherein a direction of motion of the target is determined based upon whether whichever of the first and second receivers is positioned leftmost or rightmost and whether the first or second receiver generates a signal first.

11. The system of claim 8 wherein the at least one second receiver comprises a series of second receivers positioned at predetermined heights, and the system has the capability of determining height and width of targets, the system using the information obtained by the second receivers positioned at different heights for motor vehicle detection.

12. A system for detecting and discriminating targets comprising:

at least one first receiver for receiving radiation above ground level spread in a horizontal and vertical direction;

at least one second receiver for receiving radiation above ground level spread in a horizontal and vertical direction substantially at different heights than the at least one first receiver such that the radiation received by the at least one second receiver travels through a plane perpendicular to the ground level at heights differing from the radiation received by at least one first receiver; each of the at least one first and second receivers being operatively associated with a Fresnel array such that one Fresnel array is positioned to receive radiation in the form of beam patterns substantially parallel to the horizontal plane and the other Fresnel array is positioned so as to receive radiation in the form of beam patterns at a angle, as determined by the intersection of the beams with a plane perpendicular to the ground level and perpendicular to the direction of travel, in the range of approximately 5° to 30° relative to the horizontal plane; and at least one processor for receiving data from the at least one first and second receivers, the at least one processor operating to locate a target passing in the vicinity of the at least one first and second receivers and determine the height of the target based upon the passage of the radiation at a calculated height relative to a perpendicular plane in which the target is determined to be located and the width of a target based upon the width of the passage of radiation relative to a perpendicular plane in which the target is determined to be located.

13. The system of claim 12 wherein the radiation received by the at least one first and second receivers comprises a plurality of beams comprising sub-beams with positive and negative polarity, the positive and negative polarity of the sub-beams resulting in voltages generated by the at least one first and second receivers that are proportional to the distance to the target and whereupon based on the voltages in conjunction with predetermined set of calibration values, the range of the target is estimated by the at least one processor and based upon data received from the at least one first and second receivers, the approximate height and width of the target is computed.

14. A method of target detection comprising:

obtaining data from at least one upper and lower receivers; at least one horizontally spaced upper or lower receiver adapted to receive a light beam that is spaced horizontally from the beam received by another of the at least one upper or lower receivers;

estimating the voltage difference between the at least one upper and lower receivers for each beam of radiation received using at least one processor operatively connected to and receiving signals from the at least one upper and lower receivers;

based on the voltage difference, estimating a range using a set of predetermined calibration values; the range being short range if the distance is less than a predetermined distance and long range if equal to or greater than the predetermined distance;

determining a direction of motion of the target depending on which one of the horizontally spaced at least one lower receiver or at least one upper receiver generates the signal first; such that if the at least one receiver that is adapted to receive a light beam further to the left generates a signal first, the target is moving from left to right; and if the at least one receiver that is adapted to receive a light beam further to the right generates a signal first, the target is moving from right to left;

using the at least one processor, estimating the height of the target depending on the highest beam pattern of the upper receiver that is effected by the target;

estimating the range of the target by determining the number of beams the target occupies depending on how many times the slope of the signal to the processor is changed mid stream, in the case of a short range target and, if the range is long, determining the times $t_1$ and $t_2$ when a signal crosses an average of the amplitude of the signal for both the at least one upper and lower receivers, where $t_1$ represents when the time the target is initially detected and $t_2$ represents the time the signal peaks;

estimating the velocity v of the target based on the time difference between times $t_1$ and $t_2$ and the distance between the two beams using equation $$v = \frac{D_b}{t_5 - t_1},$$

where $d_b$ is the distance between the two corresponding positive beams of the at least one upper and lower receivers, and $t_5 - t_1$ is the time it takes for the first and second signals to rise from the quiescent state for each of the at least one upper and lower receivers, respectively;

using the equation $B_w + 2W = v(t_2 - t_1)$, where $B_w$ is the width of the positive beam, and W is the length or width of the target, depending upon the origination of the beam, and where v is the speed at which the target is moving and the distance the target covered during the time period $t_2 - t_1$ is $v(t_2 - t_1)$, estimating the length and width of the target.

15. The method of claim 14 wherein the predetermined distance is determined as an indicator to differentiate between short or long ranges based upon the Fresnel lens array and number of beam patterns.

16. A system for detecting and discriminating targets comprising:

at least one first receiver for receiving radiation above ground level spread in a horizontal and vertical direction;

at least one second receiver for receiving radiation above ground level spread in a horizontal and vertical direction substantially at different heights than the at least one first receiver such that the radiation received by the at least one second receiver travels through a plane perpendicular to the ground level at heights differing from the radiation received by at least one first receiver;

each of the at least one first and second receivers being operatively associated with a Fresnel array such that one Fresnel array is positioned to receive radiation in the form of beam patterns substantially parallel to the horizontal plane and the other Fresnel array is positioned at an angle to the horizontal plane so as to receive radiation in the form of beam patterns at a angle, as determined by the intersection of the beams with a plane perpendicular to the ground level and perpendicular to the direction of travel, in the range of approximately 5° to 30° relative to the horizontal plane; and at least one processor for receiving data from the at least one first and second receivers, the at least one processor operating to locate a target passing in the vicinity of the at least one first and second receivers and determine the height of the target based upon the passage of the radiation at a calculated height relative to a perpendicular plane in which the target is determined to be located and the width of a target based upon the width of the passage of radiation relative to a perpendicular plane in which the target is determined to be located.

* * * * *